(12) United States Patent
Rike

(10) Patent No.: US 10,351,038 B2
(45) Date of Patent: Jul. 16, 2019

(54) CONVERSION SYSTEM FOR ASPHALT BOLSTER DUMP TRUCK

(71) Applicant: Palmer Trucks, Inc., Indianapolis, IN (US)

(72) Inventor: James B. Rike, Indianapolis, IN (US)

(73) Assignee: PALMER TRUCKS, INC., Indianapolis, IN (US)

(*) Notice: Subject to any disclaimer, the term of this patent is extended or adjusted under 35 U.S.C. 154(b) by 76 days.

(21) Appl. No.: 15/078,632

(22) Filed: Mar. 23, 2016

(65) Prior Publication Data
US 2016/0280121 A1 Sep. 29, 2016

Related U.S. Application Data

(60) Provisional application No. 62/137,791, filed on Mar. 24, 2015.

(51) Int. Cl.
*B60P 1/36* (2006.01)
*B60P 1/04* (2006.01)

(52) U.S. Cl.
CPC .. *B60P 1/36* (2013.01); *B60P 1/04* (2013.01)

(58) Field of Classification Search
CPC .............. E01C 19/17; E01C 2019/2095; E01C 2019/2075; B60P 1/36; B60P 1/04
USPC ......................................................... 239/657
See application file for complete search history.

(56) References Cited

U.S. PATENT DOCUMENTS

| 4,981,411 | A | * | 1/1991 | Ramsey | B65F 3/001 292/201 |
|---|---|---|---|---|---|
| 5,772,389 | A | | 6/1998 | Feller | |
| 6,186,731 | B1 | | 2/2001 | Vickers et al. | |
| 6,354,786 | B1 | | 3/2002 | Feller | |
| 6,364,598 | B1 | | 4/2002 | Vickers et al. | |
| 6,394,735 | B2 | | 5/2002 | Hollinrake et al. | |
| 6,585,472 | B2 | | 7/2003 | Hollinrake et al. | |
| 6,698,997 | B2 | | 3/2004 | Arne et al. | |
| 6,881,022 | B2 | | 4/2005 | Feller | |
| 6,945,482 | B2 | * | 9/2005 | Hollinrake | E01C 19/203 239/657 |
| 7,913,931 | B2 | * | 3/2011 | Hollinrake | E01C 19/203 239/172 |
| 2001/0014273 | A1 | * | 8/2001 | Hollinrake | B60P 1/16 414/528 |
| 2001/0046432 | A1 | * | 11/2001 | Hollinrake | B60P 1/16 414/528 |
| 2002/0110443 | A1 | * | 8/2002 | Hollinrake | B60P 1/16 414/489 |
| 2011/0188979 | A1 | * | 8/2011 | Ketels | B60P 1/00 414/519 |

(Continued)

*Primary Examiner* — Chee-Chong Lee
(74) *Attorney, Agent, or Firm* — Tucker Ellis, LLP; Carlos Garritano; Patrick Clunk

(57) ABSTRACT

Provided is a vehicle including a frame and a dump body supported by the frame to be move relative to the frame between a dump position and aloud position. The dump body includes first and second sidewalls, a front wall, a floor having a first opening, a tailgate, and an apron below the tailgate, the apron having a second opening substantially perpendicular to the first opening. The vehicle also includes an endless conveyor configured to direct material to the second opening and removably attached to the dump body below the floor such that material is prevented from exiting the dump body through the first opening.

19 Claims, 28 Drawing Sheets

(56) References Cited

U.S. PATENT DOCUMENTS

2012/0056011 A1\* 3/2012 Hollinrake ............ E01H 10/007
 239/172

\* cited by examiner

CONVERSION SYSTEM FOR ASPHALT BOLSTER DUMP TRUCK

RELATED APPLICATION

This application claims the benefit of U.S. Provisional Application No. 62/137,791 filed Mar. 24, 2015, the entirety of which is hereby incorporated herein by reference.

BACKGROUND

Trucks, such as dump trucks, transport material, such as salt, sand, dirt, asphalt etc., and dump the materials onto the ground by tilting a bed of the truck. Dump trucks can also be used for spreading the materials onto the ground to melt ice and improve vehicle traction, for example by using an endless conveyor.

TECHNICAL FIELD

Embodiments of the subject matter disclosed herein relate to a truck, and more particularly a dump truck with an asphalt bolster.

BRIEF DESCRIPTION

In an embodiment, a vehicle is provided. The vehicle can include at least the following: an engine; a frame that supports the engine, a cabin, a front axle, a rear axle, and a dump body; the dump body configured to house a volume, the dump body further comprising: a driver side sidewall; a passenger side sidewall; a front wall; a floor; an apron; and a tailgate; a first aperture positioned on the apron; a second aperture positioned on the floor; an endless conveyor with a first end and a second end opposite thereto, the endless conveyor is configured to engage within the second aperture positioned on the floor such that the first end is proximate to the front wall and the second end is proximate to the first aperture positioned on the apron; a motor that drives the endless conveyor, the motor is positioned in a cutout of a portion of the frame; an air cylinder system positioned within an interior of the tailgate and is configured to control movement of the tailgate or movement of a door for a chute, wherein the chute is positioned inside the dump body proximate to the second end of the endless conveyor; a pre-wet tank coupled to an exterior of the front wall of the dump body; the dump body being configured for pivotable displacement between a first position and a second position, wherein the first position includes the floor substantially parallel to a ground-level and the second position includes the floor at an incline; and a spreader assembly attached to the frame and being substantially parallel to the ground-level with the dump body in the second position.

In an embodiment, a vehicle is provided that includes a frame and a dump body supported by the frame and configured to move relative to the frame between a dump position and a load position, the dump body including first and second sidewalls, a front wall, a floor having a first opening, a tailgate having a second opening, and an apron below the tailgate, the apron having a third opening substantially perpendicular to the first opening. The vehicle can further include an endless conveyor positioned in the first opening, configured to direct material to the third opening and removably attached to the dump body below the floor such that material is prevented from exiting the dump body through the first opening.

In an embodiment, a kit is provided for converting a vehicle between a summer mode and a winter mode and vice versa, the vehicle having a frame and a dump body attached to the frame, the body being movable between a dump position and a load position. The kit can include a dump body having a floor with a first opening, a tailgate with a second opening, and an apron having a third opening that is configured to receive an endless conveyor and allow material to dispense from the dump body and the endless conveyor configured to be removably attached to the body positioned in the first opening, wherein a motor that drives the conveyor is positioned in a cutout of a sill of the dump body. The kit can further include a spreader assembly configured to be removably attached to the frame of the vehicle to receive the dispensed material from the third opening such that movement of the body and the endless conveyor between the dump position and the load position does not affect a position of the spreader assembly.

In an embodiment, a vehicle is provided that can include a frame that supports a cabin, a front axle, a rear axle, and a dump body; the dump body configured to house a volume, the dump body further comprising a driver side sidewall, a passenger side sidewall, a front wall, a floor, an apron, and a tailgate; a first aperture positioned on the floor; a second aperture positioned on the tailgate; a third aperture positioned on the apron; an endless conveyor with a first end and a second end opposite thereto, the endless conveyor configured to engage within the first aperture positioned on the floor such that the first end is proximate to the front wall and the second end is proximate to the third aperture positioned on the apron; a chute positioned inside the dump body proximate to the second end of the endless conveyor; an air cylinder system positioned at the second aperture within an interior of the tailgate configured to control movement of the tailgate and/or movement of a door for the chute; a pre-wet tank coupled to an exterior of the front wall of the dump body on a location that is at least one of a driver side or a passenger side; wherein the dump body is configured for pivotable displacement between a first position and a second position, wherein the first position includes the floor substantially parallel to a ground-level and the second position includes the floor at an incline; the dump body that is convertible from a winter mode to a summer mode; the winter mode is the vehicle having at least the frame, the cabin, the front axle, the rear axle, the endless conveyor, the chute, and the dump body having the first aperture, the second aperture, and the third aperture; and the summer mode is the vehicle having at least the frame, the cabin, the front axle, the rear axle, the dump body, and the dump body having a first plate to cover the first aperture, a second plate to cover the second aperture, and a third plate to cover the third aperture.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
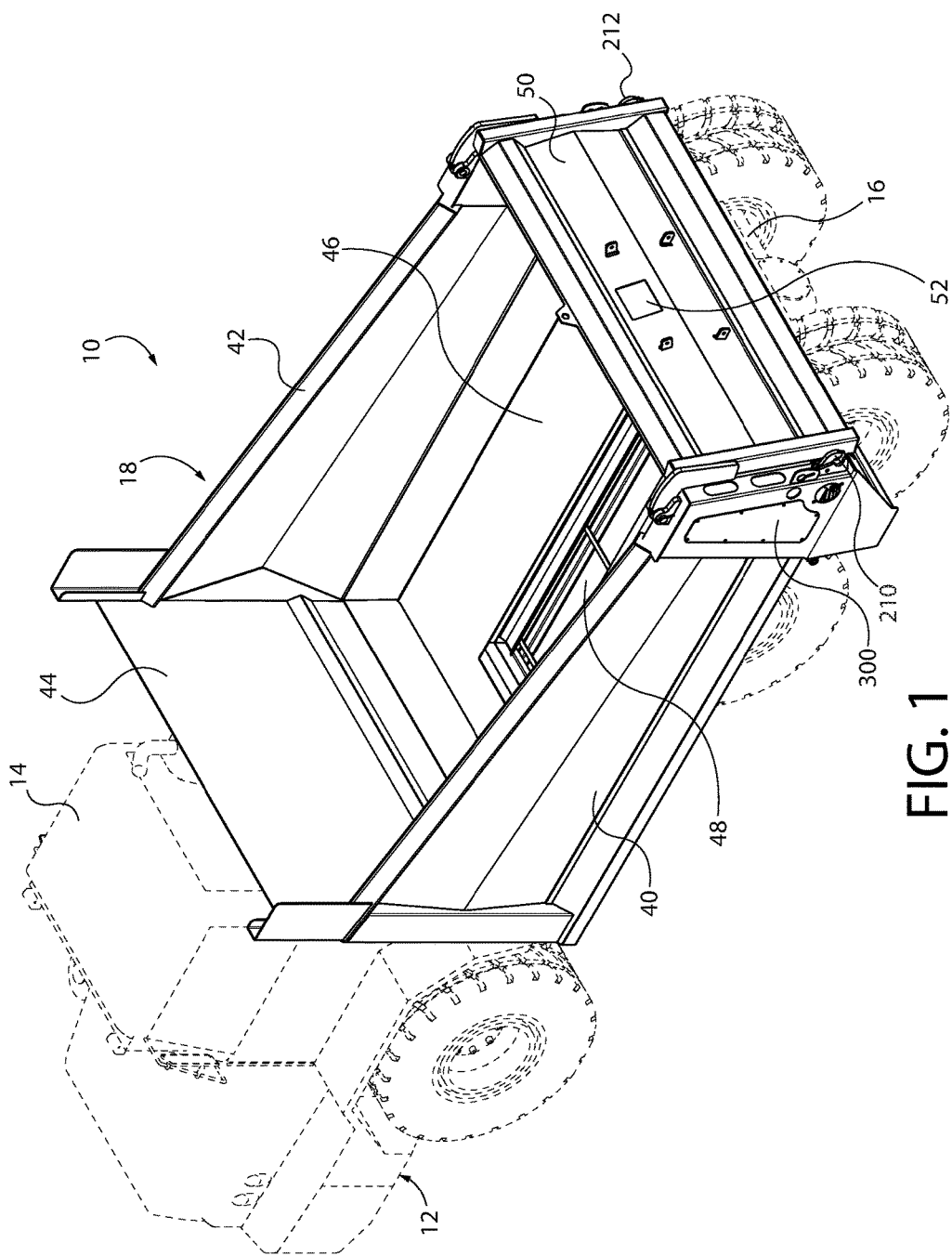
FIG. 1 is a perspective view of vehicle with a dump body in a lowered position.

Embodiments of the provided subject matter relate to a vehicle having a dump body that is convertible to a summer mode and a snow/ice mode (also referred to as winter mode). The vehicle in the snow/ice mode can include features that facilitate clearing roads of snow or ice and can include at least one of a snowplow, a spreader, de-icer liquid, conveyor to dispense material, among others described herein. The summer mode for the vehicle can include the dump body in which apertures (discussed below) that were used in the winter mode for an endless conveyor and associated components are covered. The vehicle having a dump body can include a dump body having a driver side sidewall, a passenger side sidewall, a front wall, a floor, a tailgate, and an apron. The dump body is configured to hold or house a volume. By way of example and not limitation, the dump body can be used to house a first material in the summer mode and a second material in the winter mode. For instance, the first material can be, but is not limited to being, dirt, gravel, asphalt, sand, and the like. In another instance, the second material can be, but is not limited to being, salt, sand, gravel, and the like. The dump body includes a first aperture on a floor that is configured to receive an endless conveyor. The endless conveyor can be positioned within a plane below the floor but in the same plane as the apron of the dump body. The dump body can include a second aperture on a tailgate. The apron can include a third aperture in which the third aperture is where material transported by the endless conveyor is dispensed from the dump body and where the endless conveyor is inserted into the first aperture of the dump body.

The endless conveyor can include a first end and a second end opposite thereto in which the second end is positioned in the third aperture on the apron. Moreover, a chute can be positioned within the dump body that meters material from the dump body to the second end and third aperture for dispensing out of the dump body. The chute can be controlled by an air cylinder system, for example. In another example, the chute can be controlled by a hydraulic, cylinder, electrical, motor, combustion engine, among others.

The vehicle can further include a spreader that is coupled to the frame of the vehicle. In particular, the spreader is not coupled to the dump body. One or more guides can be coupled to the endless conveyor to direct or guide material exiting the second aperture.

With reference to the drawings, like reference numerals designate identical or corresponding parts throughout the several views. However, the inclusion of like elements in different views does not mean a given embodiment necessarily includes such elements or that all embodiments of the invention include such elements.

Figure 2:
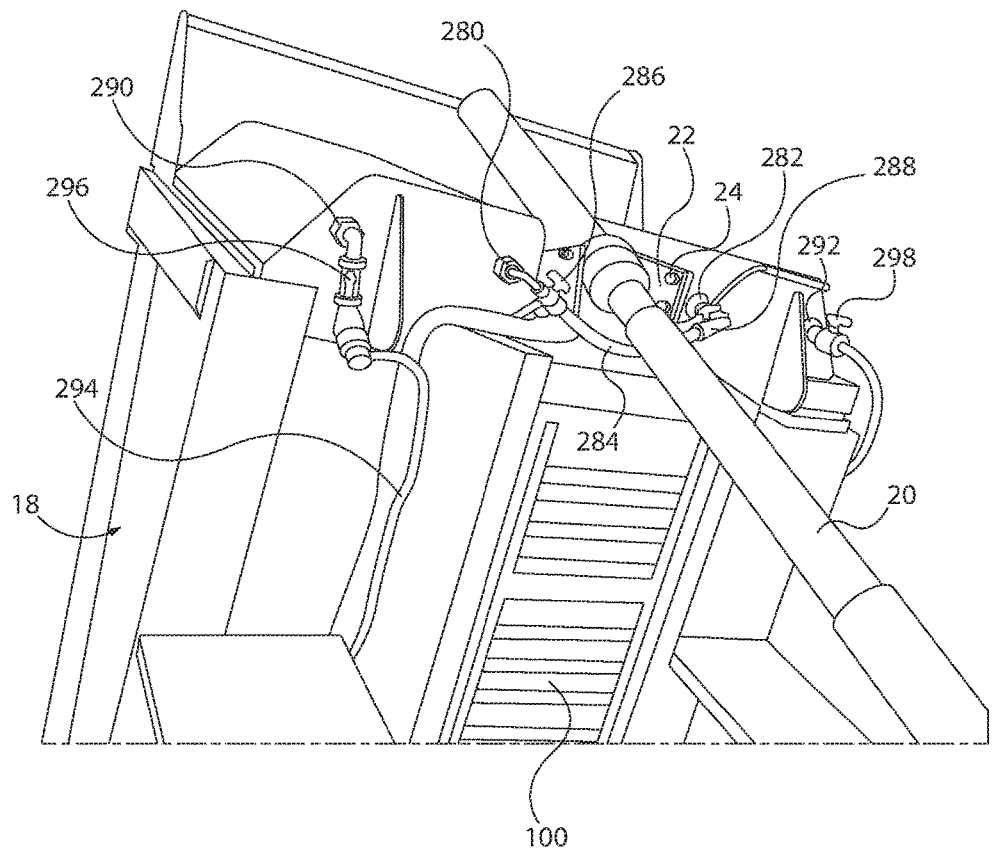
FIG. 2 is a perspective view of a portion of the vehicle with the dump body in a raised position.

Referring now to FIGS. 1 and 2, a vehicle, such as a dump truck, is illustrated by reference numeral 10. The vehicle 10 includes a frame 12, an engine supported by the frame 12, a cabin 14 supported by the frame 12, a front axle and at least one rear axle 16 supported by the frame 12, and a dump body 18 supported by the frame 12. The dump body 18 is movable relative to the frame 12 between a dump position (also referred to as inclined position or raised position) for dumping material shown in FIGS. 2 and 3 and a load position (also referred to as horizontal position or lowered position) relative to the ground shown in FIG. 1 by one or more hydraulic cylinders 20 attached to the frame 12 and to the dump body 18 at bracket 22 in any suitable manner, such as by bolts 24.

Turning now to FIGS. 3-28 in addition to FIG. 1, the dump body 18 includes first and second sidewalls (e.g., driver side and passenger side sidewalls) 40 and 42, a front wall 44, a floor 46 having a first opening or aperture 48, a tailgate 50 having a second opening or aperture 52, and an apron 54 below the tailgate 50 having a third opening or aperture 56. The second and third openings 52 and 56 are substantially perpendicular to the first opening 48.

Figure 4:
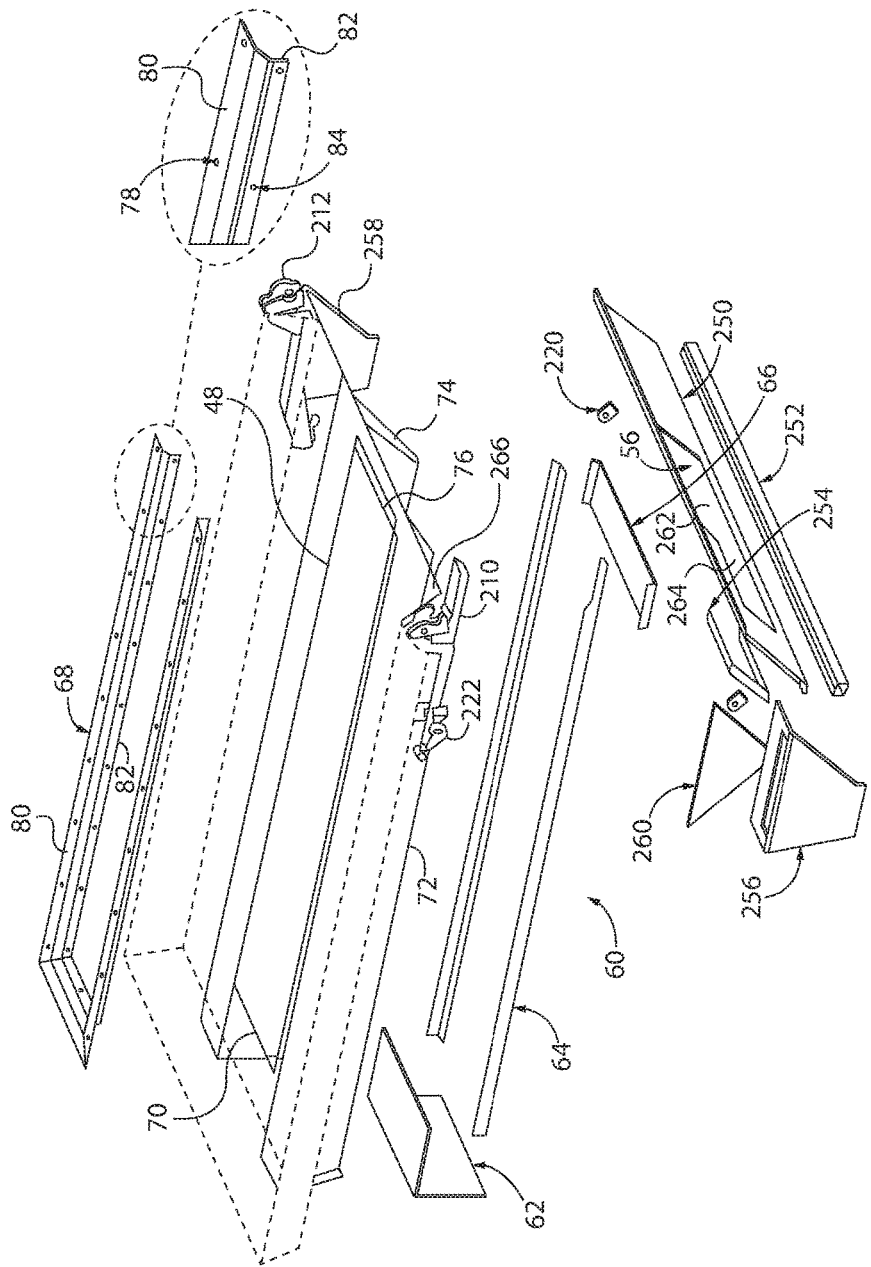
FIG. 4 is an exploded view of a conveyor support assembly and an apron.

As shown in FIG. 4, to support and strengthen the opening 48 in the floor 46, the dump body 18 includes a conveyor support assembly 60, which is shown in an exploded view in FIG. 4 along with the apron 54. The support assembly 60 includes a conveyor front plate 62, a pair of angle iron portions 64, a body hinge plate 66, and a conveyor guide 68. The conveyor front plate 62, which is an L-shaped plate, is secured below the floor 46 near a first end 70 of the opening 48 proximate the front wall 44. The pair of angle iron portions 64 extend the length of the opening 48 and are secured to a pair of sills 72 and 74 (also referred to as the pair of long sills 72 and 74). The long sills 72 and 74 extend longitudinally on either side of the opening 48 below the floor 46 and form with the iron portions 64 a track for wheel assemblies of an endless conveyor as discussed below. In an embodiment, the long sills 72 and 74 reside in the same plane as the third opening 56. The body hinge plate 66 is secured to the pair of long sills 72 and 74 near a second end 76 of the opening 48 proximate the tailgate 50 and below the pair of angle iron portions 64. The conveyor guide 68, shown as a u-shaped member, surrounds three sides of the opening 48 and is secured to the floor 46, such as by welding, such as by spot welding at openings 78. The conveyor guide 68 has atop portion 80 secured to the floor 46 and aside portion 82 that extends through the opening 48. The side portion 82 includes a plurality of openings 84 for securing a rubber strip to the side portion, such as by bolts.

The conveyor support assembly 60 supports and/or guides the endless conveyor 100, shown in FIGS. 5-10. The endless conveyor 100 includes a first end 102 proximate the front wall 44 and a second end 104 opposite thereto proximate the third opening 56 in the apron 54. The endless conveyor 100 is installed in the dump body 18 by inserting the first end 102 into the third opening 56 and advancing the conveyor until the first end 102 is positioned near the first end 70 of the first opening 48 below the opening 48. The endless conveyor 100 is then coupled to dump body 18, and in the illustrated embodiment to the apron 54 via a pair of brackets 106 on opposite sides of the endless conveyor 100 that receive respective fasteners 108, such as bolts secured to the apron 54. The endless conveyor 100 can then be connected to a motor 110, such as a hydraulic direct drive motor connected to the dump body 18 that power the endless conveyor. In another embodiment, the endless conveyor 100 can have an integrated power source (e.g., motor, battery, etc.) in which the dump body is configured to mate. By way of example and not limitation, the endless conveyor 100 can include a power source on the second end 104 that is positioned in a cutout of one of the pair of long sills 72 and 74.

The endless conveyor 100 includes an endless belt 112, a plurality of longitudinally spaced slats 114 on the belt 112, and a pair of support rails 116 extending longitudinally along the sides of the endless conveyor 100. Material sits on the belt between the longitudinally spaced slats 114 and is directed towards the third opening 56 when the conveyor is activated. The support rails 116 can be any suitable shaped, such as c-shaped rails having portions along the sides, top, and bottom of the conveyor. Attached to the support rails 116 are a plurality of wheel assemblies 118 longitudinally spaced along the support rails 116. Each wheel assembly includes a vertical alignment plate 120, a wheel 122, an axle 124, which may be a bolt, such as a hex bolt extending through the wheel 122 and an opening 126 in the alignment plate 120, and a pair of nuts 128, such as hex nuts secured to each end of the axle to secure the wheel 122 to the alignment plate 120. During installation of the endless conveyor 100, the wheels ride along the track formed by the long sills 72 and 74 and the iron portions 64, and can rest against the track when the endless conveyor 100 is installed and/or secured to the dump body 18 for the winter mode.

The endless conveyor 100 directs the material to the third opening 56 where the material passes through a chute 130 shown in FIGS. 11-14. The chute 130 can be configured to meter material housed by the dump body 18 and includes a gate housing 132, a pair of guide strips 134, a pair of gate keepers 136, a pair of rods 138, and a gate 140. The gate housing 132 is formed by a piece of metal bent to include a planar portion 142 and side portions 144 extending from the planar portion 142. It will be appreciated that the gate housing 132 could alternatively be formed by a plurality of pieces coupled together. The guide strips 134 abut the planar portion 142 and the gate keepers 136 abut the guide strips 134 to form an area that guides movement of the gate 140.

The gate keepers 136 and guide strips 134 have openings that align with one another and with respective openings in the planar portion 142 to receive fasteners 146 to secure the guide strips 134 and gate keepers 136 to the planar portion 142. The rods 138 extend between and are coupled to the side portions 144.

When the chute 130 is positioned in the dump body, bottom portions 148 of the planar portion 142 and the bottoms of the side portions 144 rest on the conveyor guide 68, and the side portions 144 have a profile that matches a profile of the tailgate 50, in particular to an inner portion of the tailgate 50. The side portions 144 are also angled so as to prevent damage to the side portions when the tailgate 50 is opened and/or closed. In particular, when the tailgate 50 is unlatched (e.g., via the air cylinder system for latching or unlatching the tailgate 50), the tailgate 50 can swing from 90 degrees to approximately 180 degrees with a hinge on the topside of the tailgate 50, wherein the swing motion can be toward the front of the vehicle or the rear of the vehicle). The chute 130 is then secured to the tailgate, for example by pins. The planar portion 142 is attached to an air cylinder system (discussed in more detail in FIG. 3) that is received in the second opening 52 in the tailgate 50. An arm of the air cylinder system is attached to one of a plurality of pieces of tubing 150 secured to the gate 140 to vary the metering of the gate 140 and control the metering of material dispensed via the endless conveyor 100.

Figure 11:
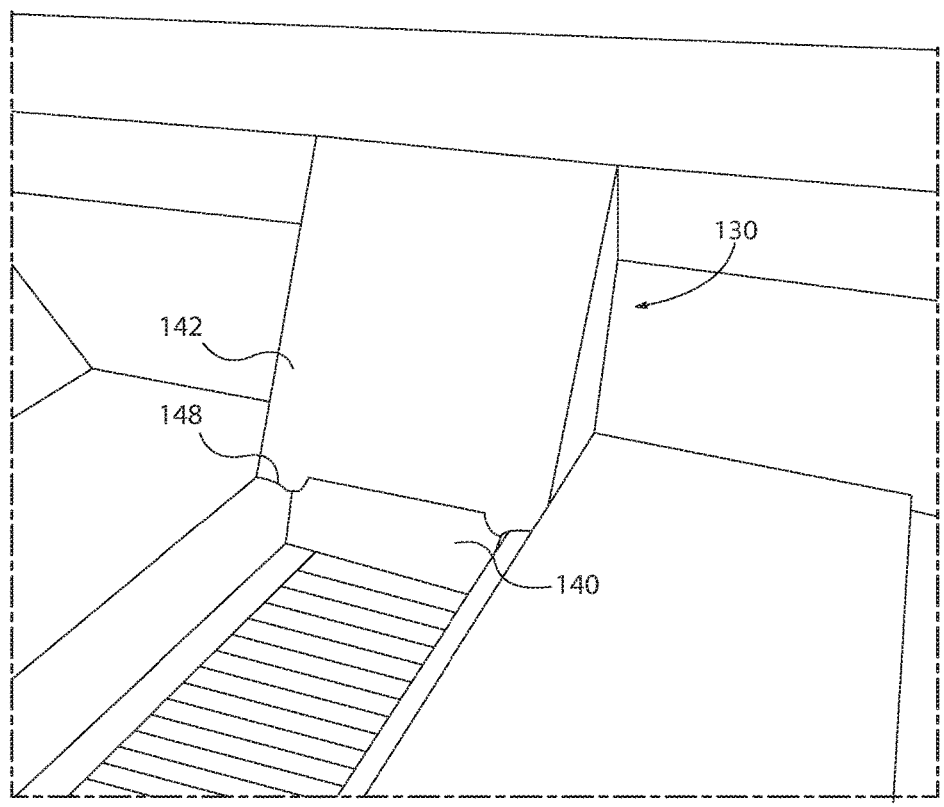
FIG. 11 is a view of a chute attached to the dump body.
Figure 12:
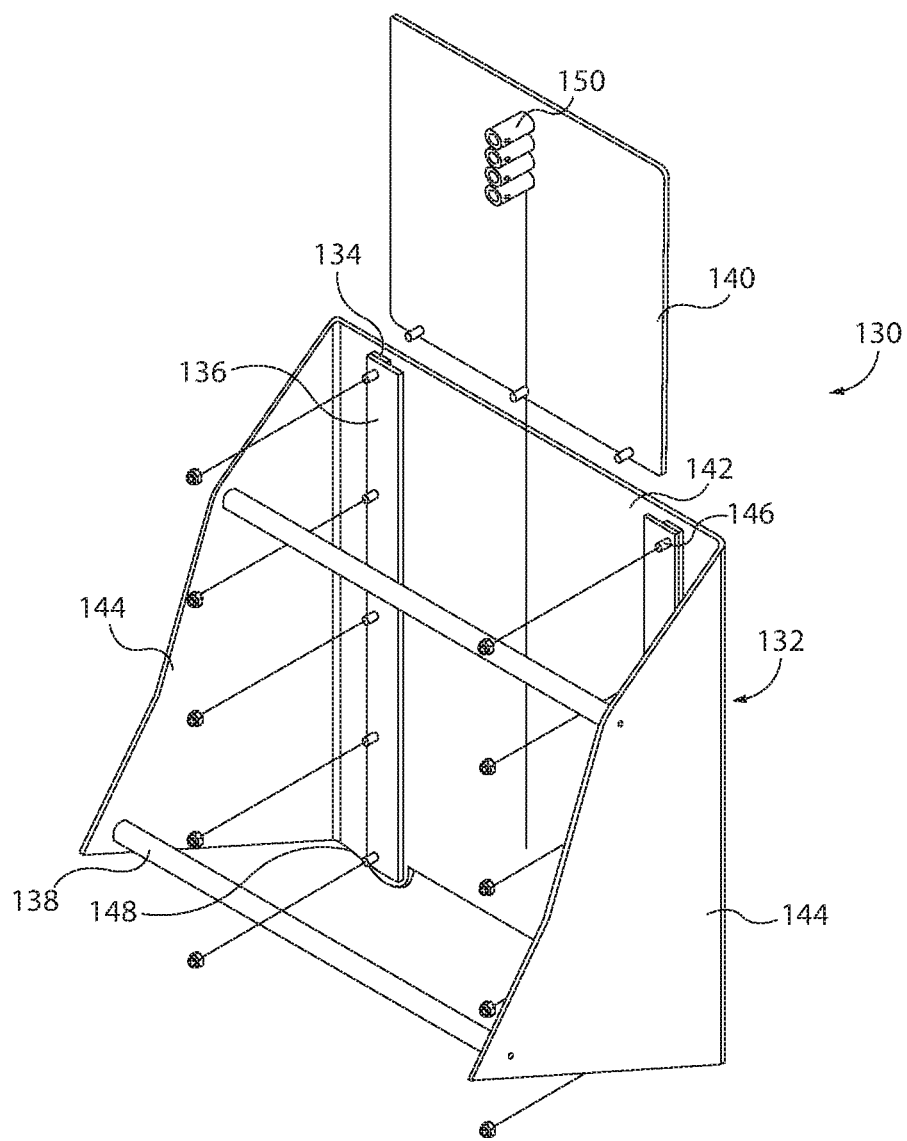
FIG. 12 is a perspective view of the chute.
Figure 14:
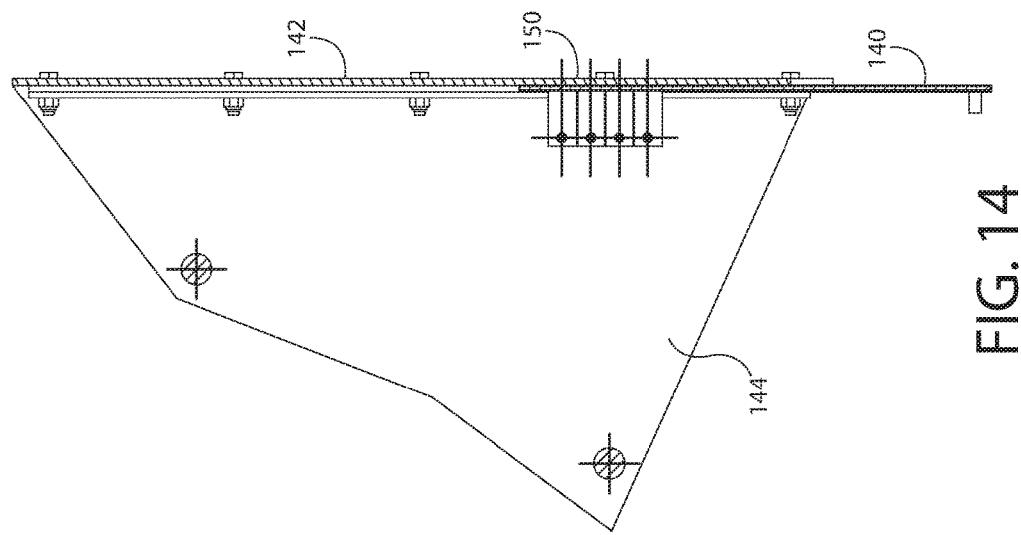
FIG. 14 is a cross-sectional view of the chute taken along line A-A in FIG. 13.
Figure 13:
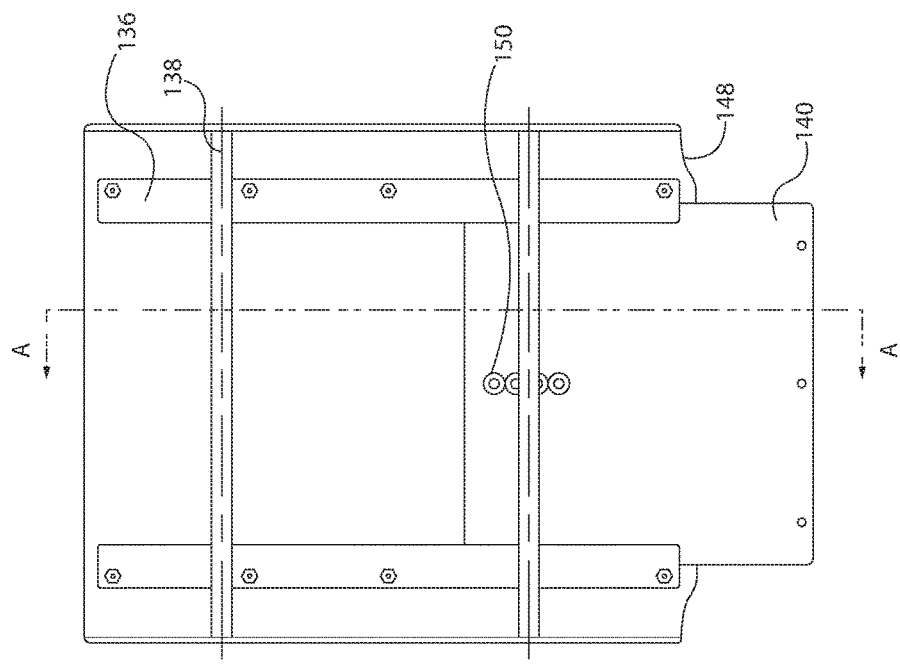
FIG. 13 is a front view of the chute.
Figure 15:
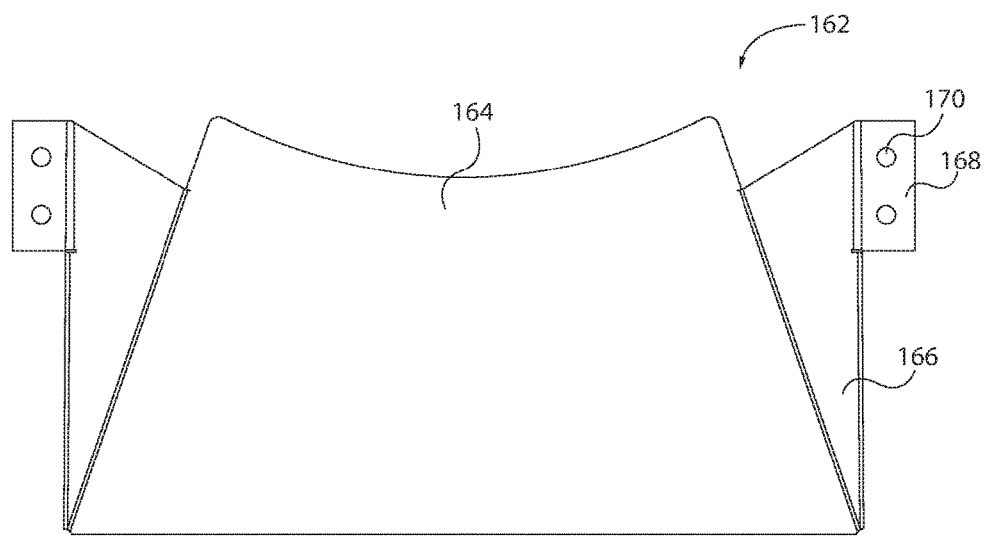
FIG. 15 is a top view of a conveyor lip.
Figure 16:
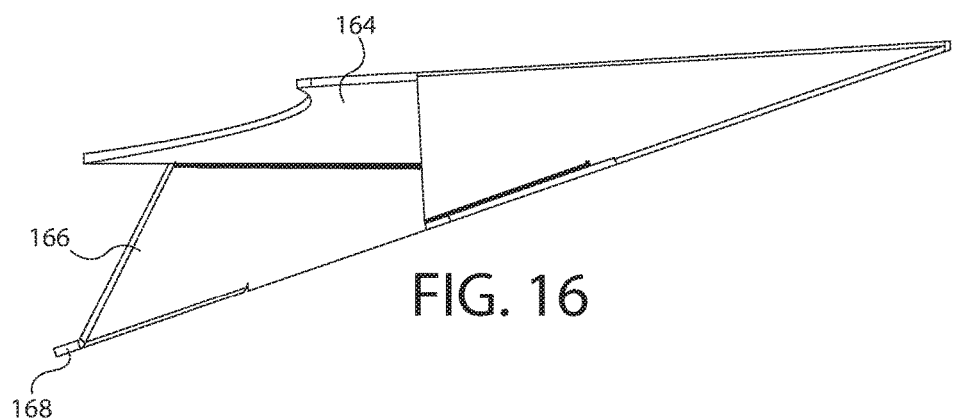
FIG. 16 is a perspective view of the conveyor lip.
Figure 17:
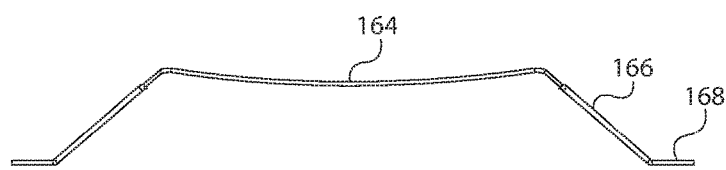
FIG. 17 is an end view of the conveyor lip.
Figure 18:
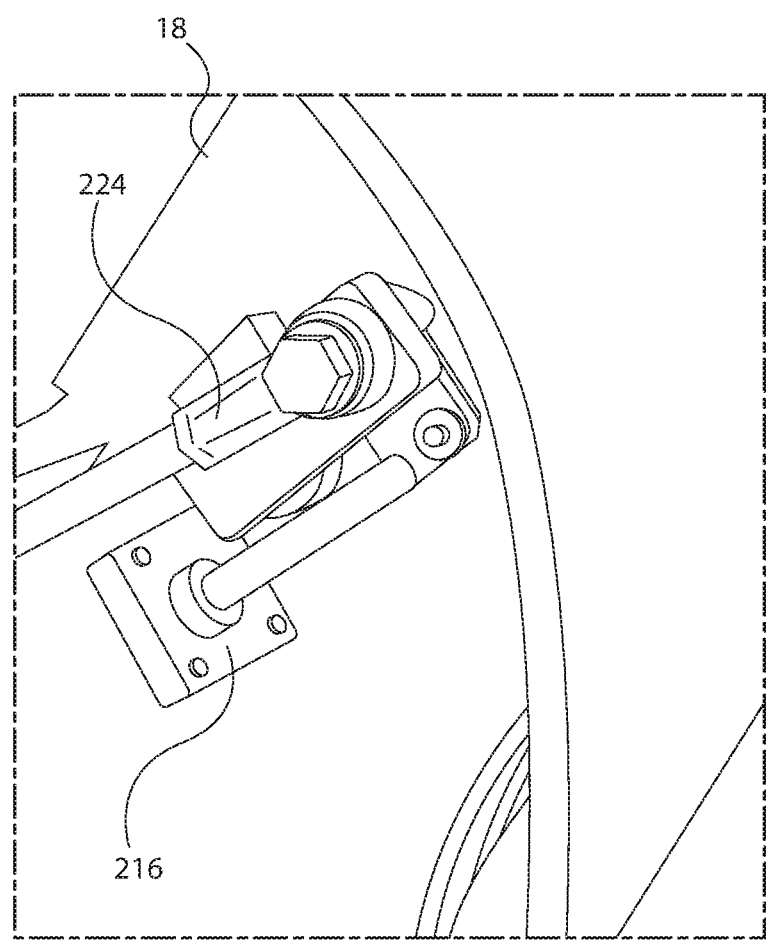
FIG. 18 is a view of an underside of the dump body showing an air cylinder system and linkage assembly.
Figure 19:
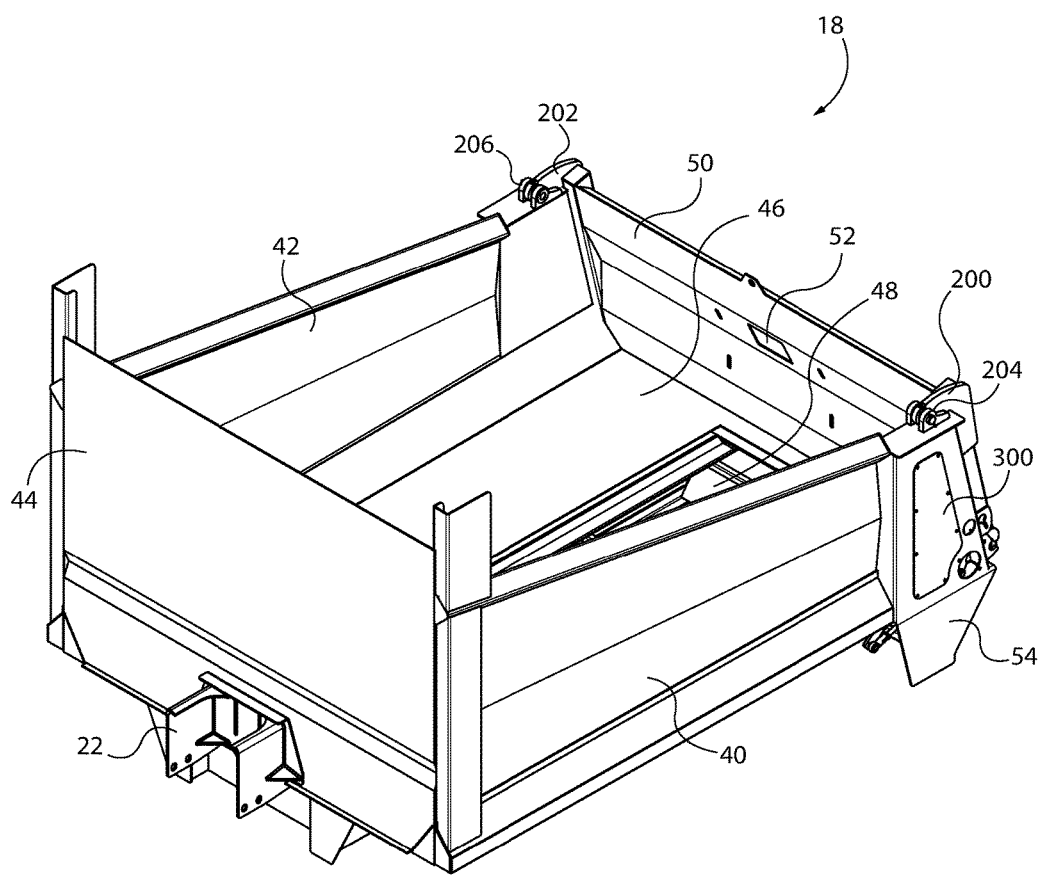
FIG. 19 is a perspective view of the dump body.
Figure 20:
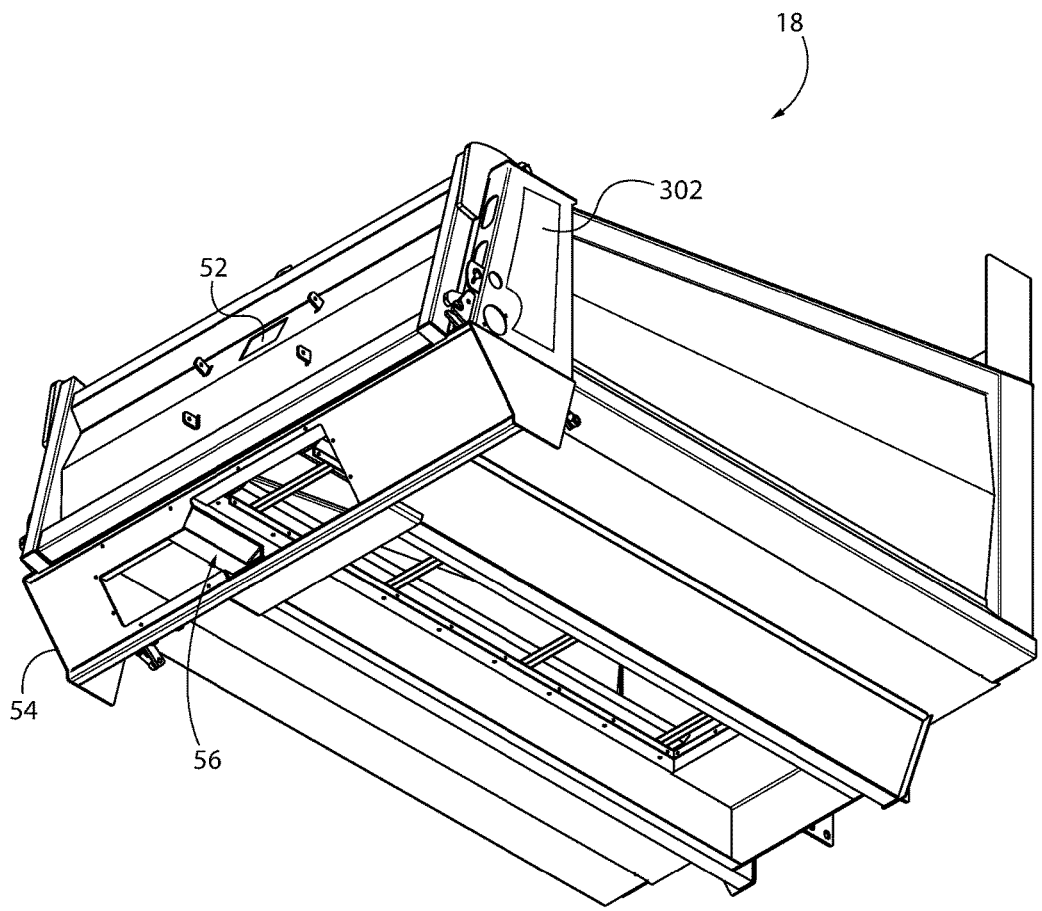
FIG. 20 is another perspective view of the dump body.
Figure 21:
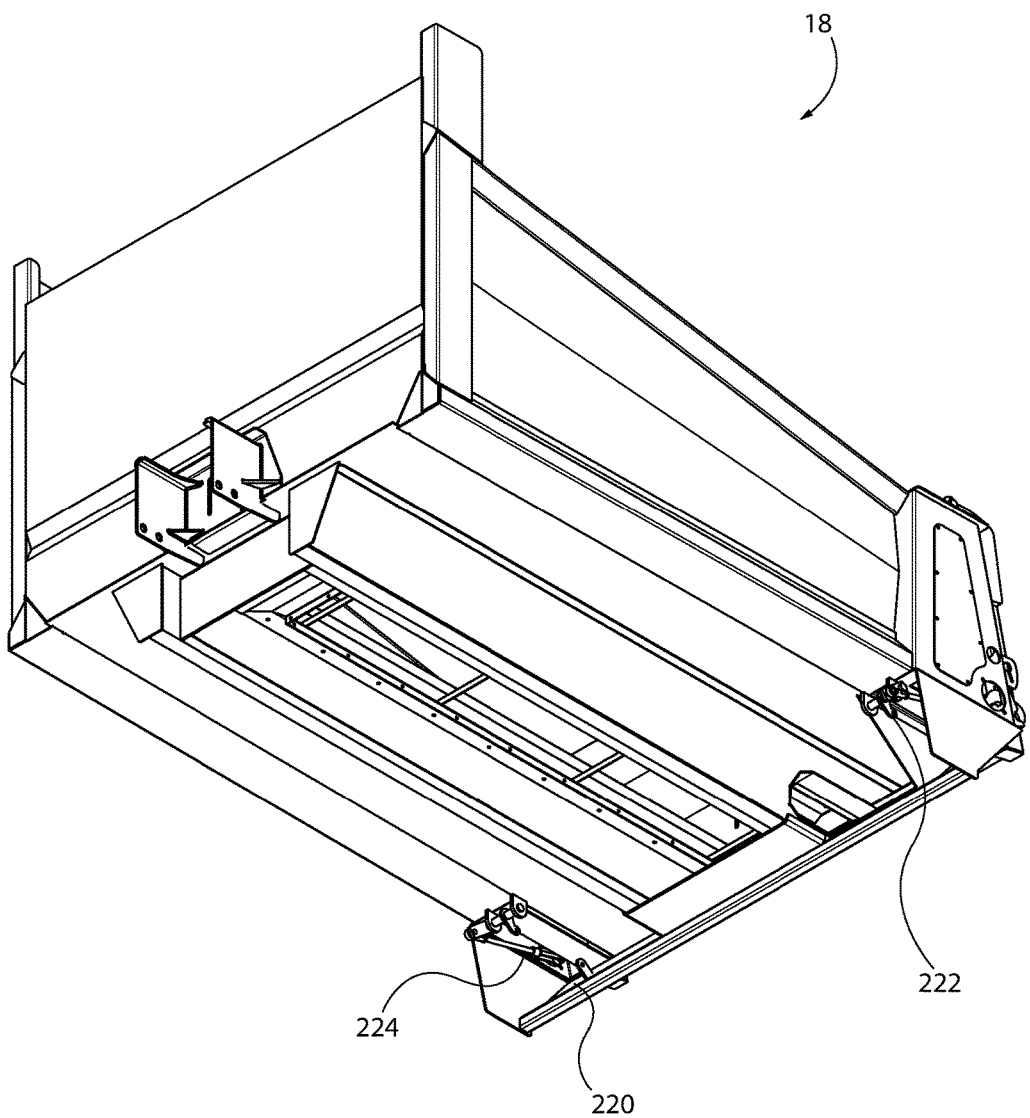
FIG. 21 is still another perspective view of the dump body.
Figure 22:
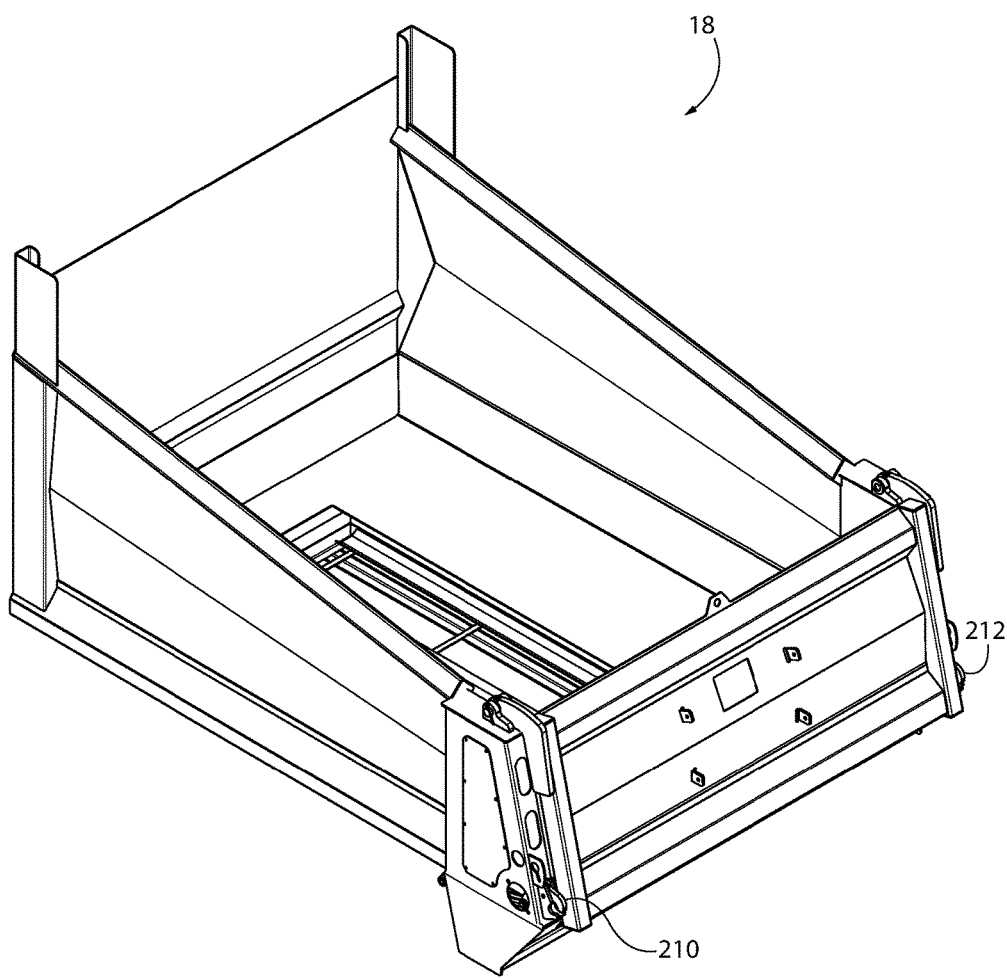
FIG. 22 is yet another perspective view of the dump body.
Figure 23:
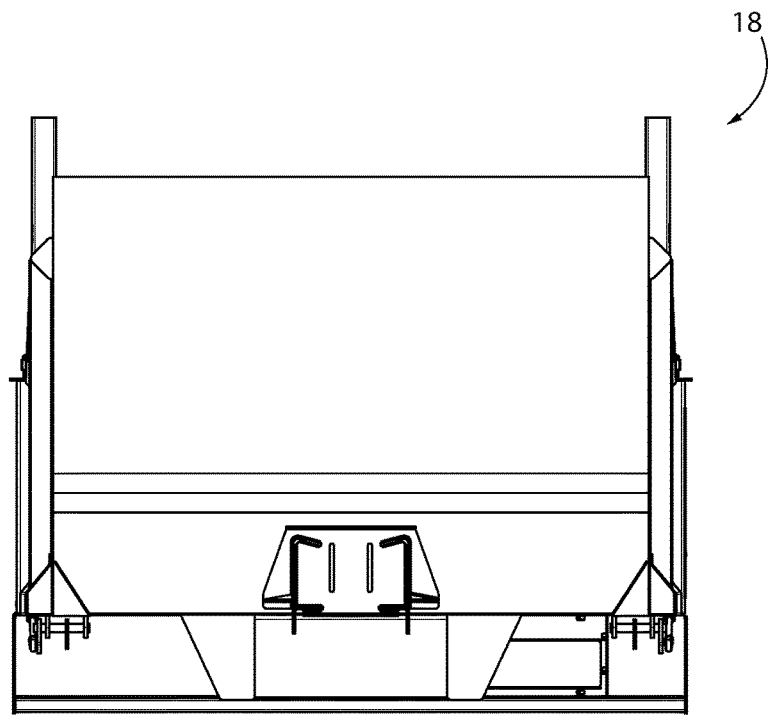
FIG. 23 is a front view of the dump body.
Figure 24:
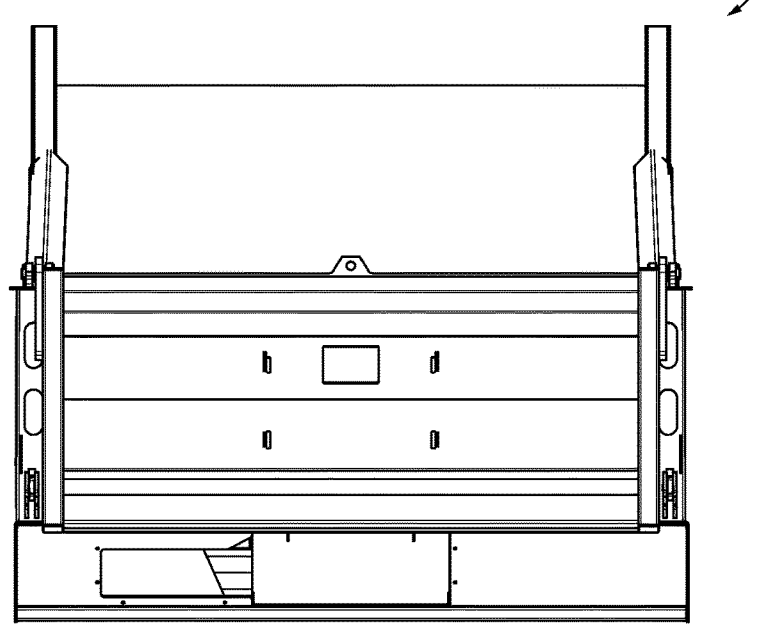
FIG. 24 is a rear view of the dump body.
Figure 25:
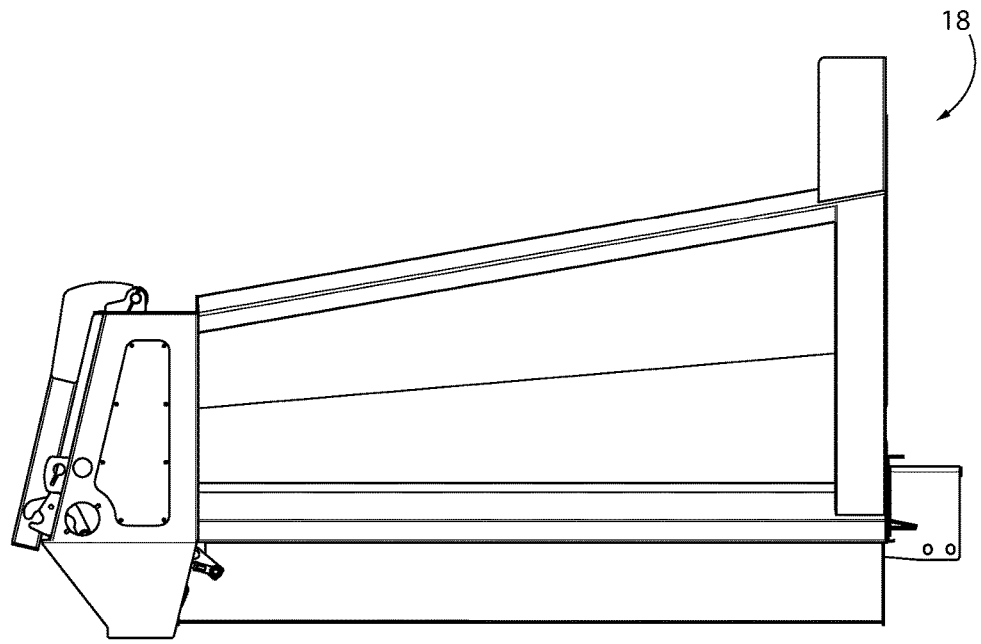
FIG. 25 is a passenger side view of the dump body.
Figure 26:
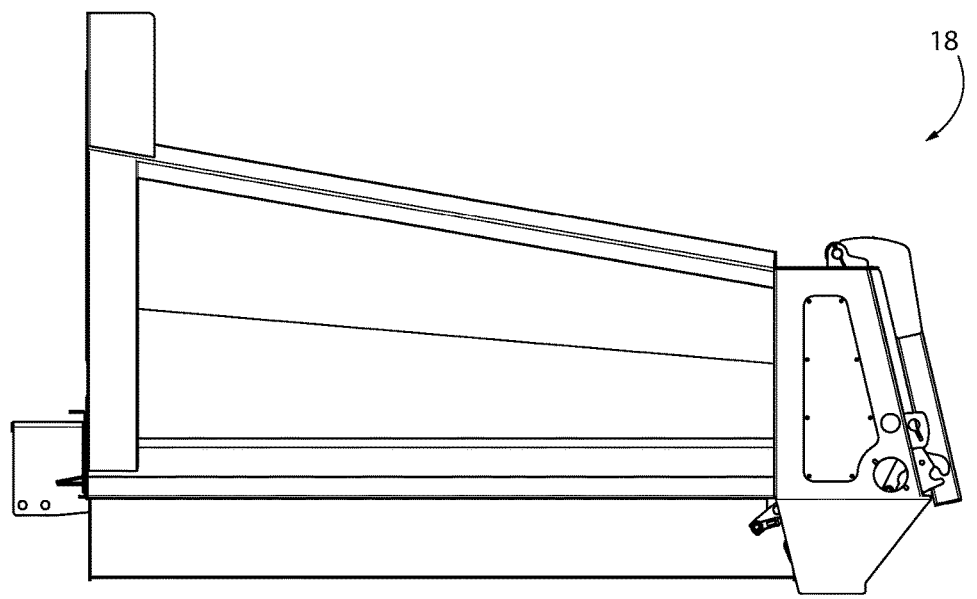
FIG. 26 is a driver side view of the dump body.
Figure 27:
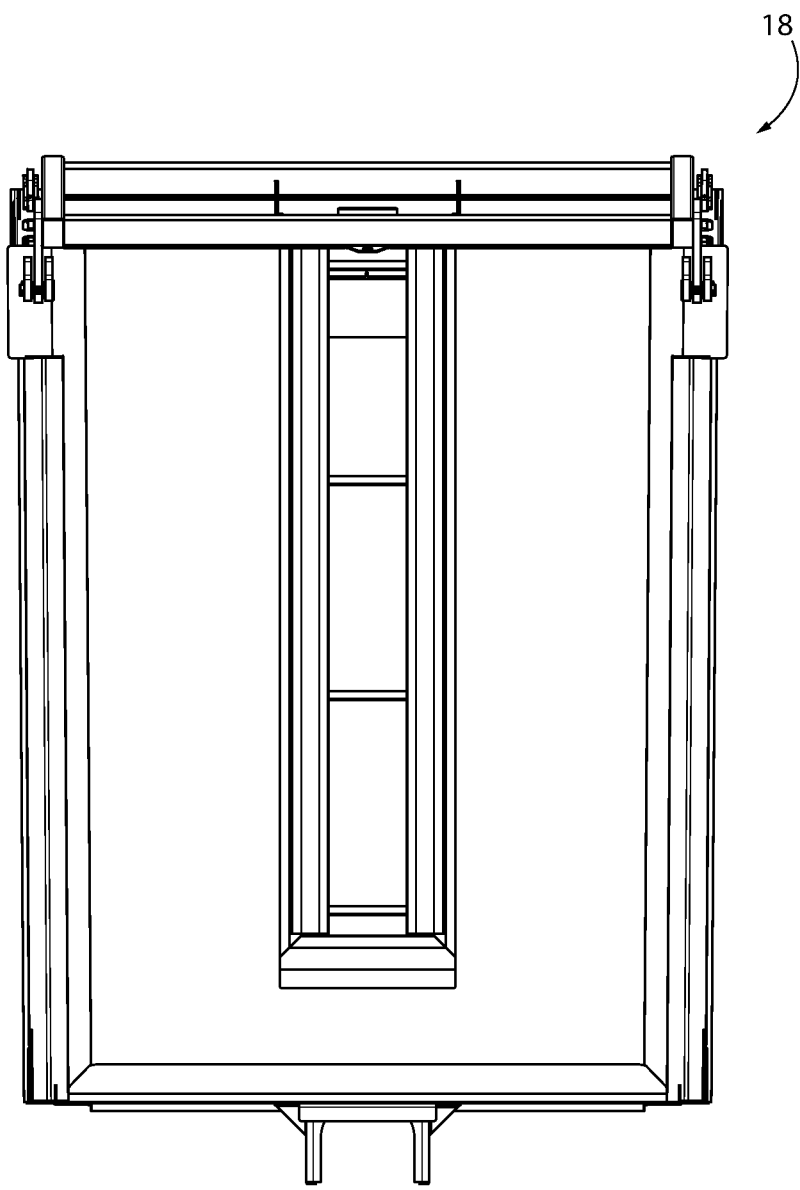
FIG. 27 is a top view of the dump body.
Figure 28:
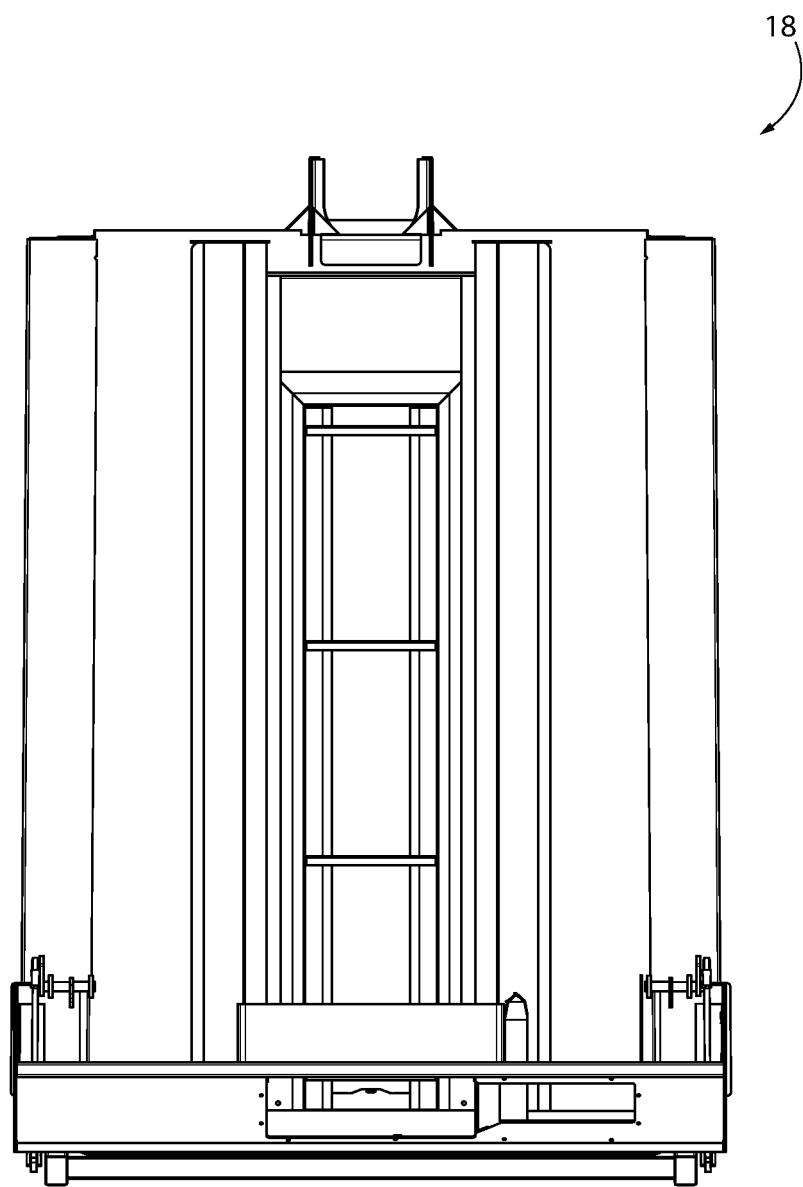
FIG. 28 is a bottom view of the dump body.
Figure 29:
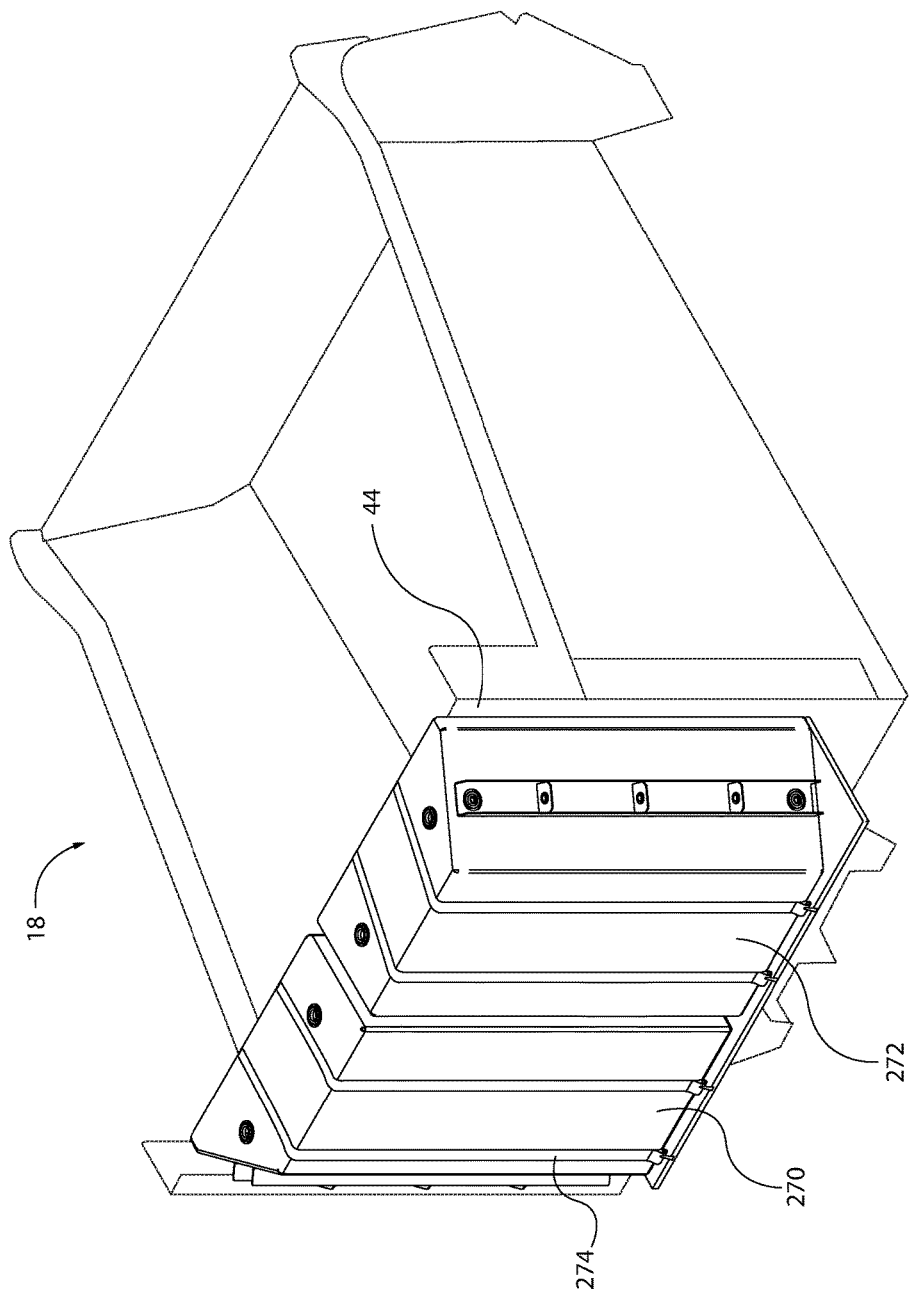
FIG. 29 is a perspective view of the dump body with pre-wet tanks attached thereto.
Figure 30:
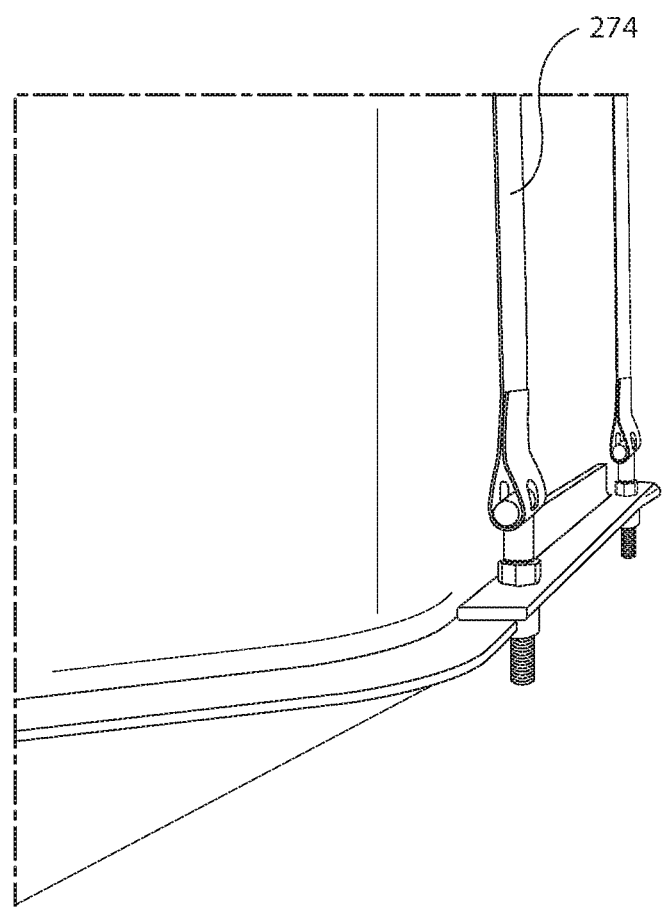
FIG. 30 is another view of the dump body with pre-wet tanks.
Figure 31:
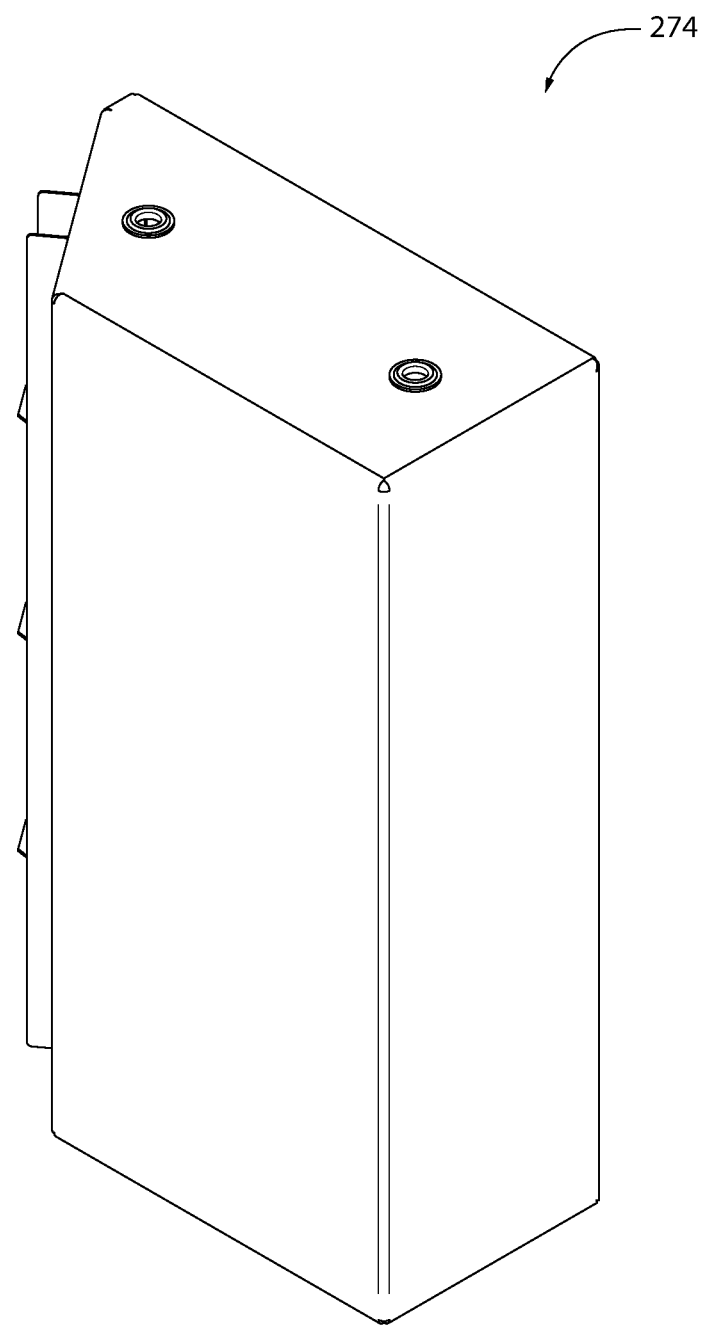
FIG. 31 is a perspective view of one of the pre-wet tank.
Figure 32:
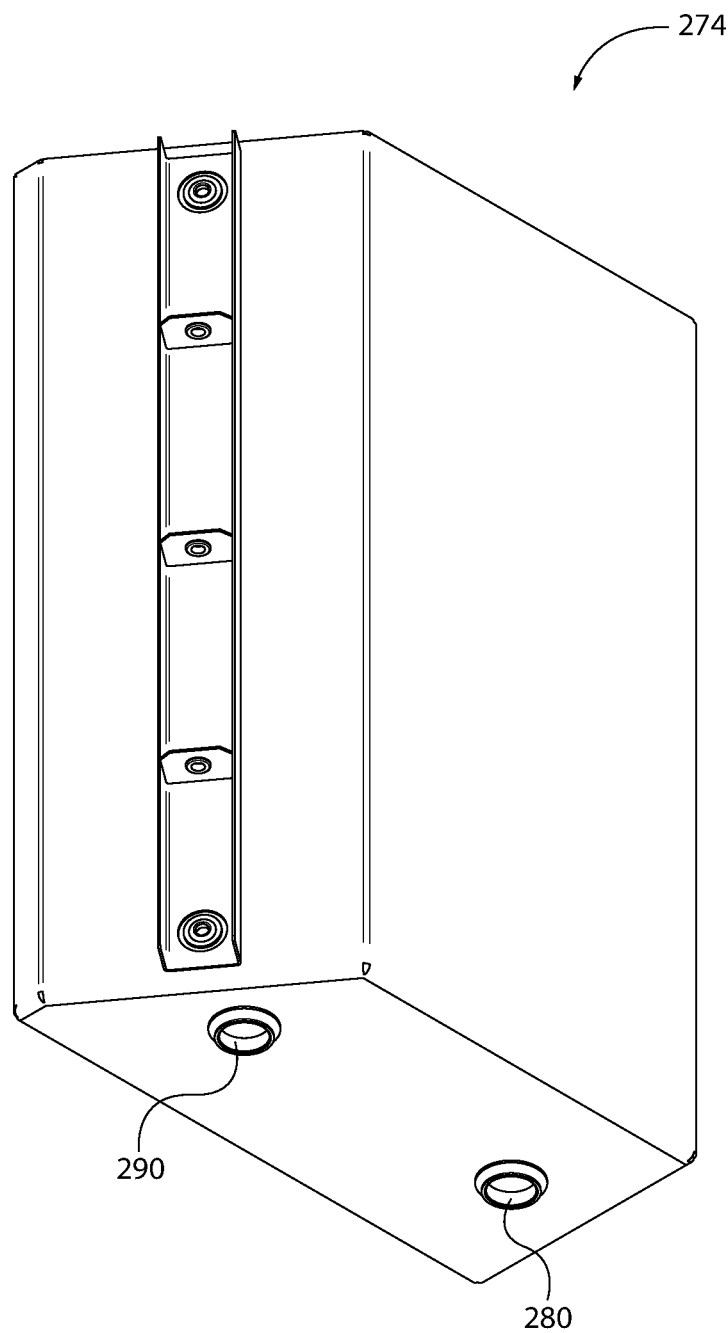
FIG. 32 is another perspective view of one of the pre-wet tanks.

The chute 130 is shown in the closed position in FIG. 11, where material is prevented from passing from the endless conveyor 100 through the third opening 56. The chute 130 is shown in the open position in FIGS. 5 and 6, where the chute 130 has moved vertically towards the top of the tailgate 150 and material can pass from the endless conveyor 100 through the third opening 56.

Figure 5:
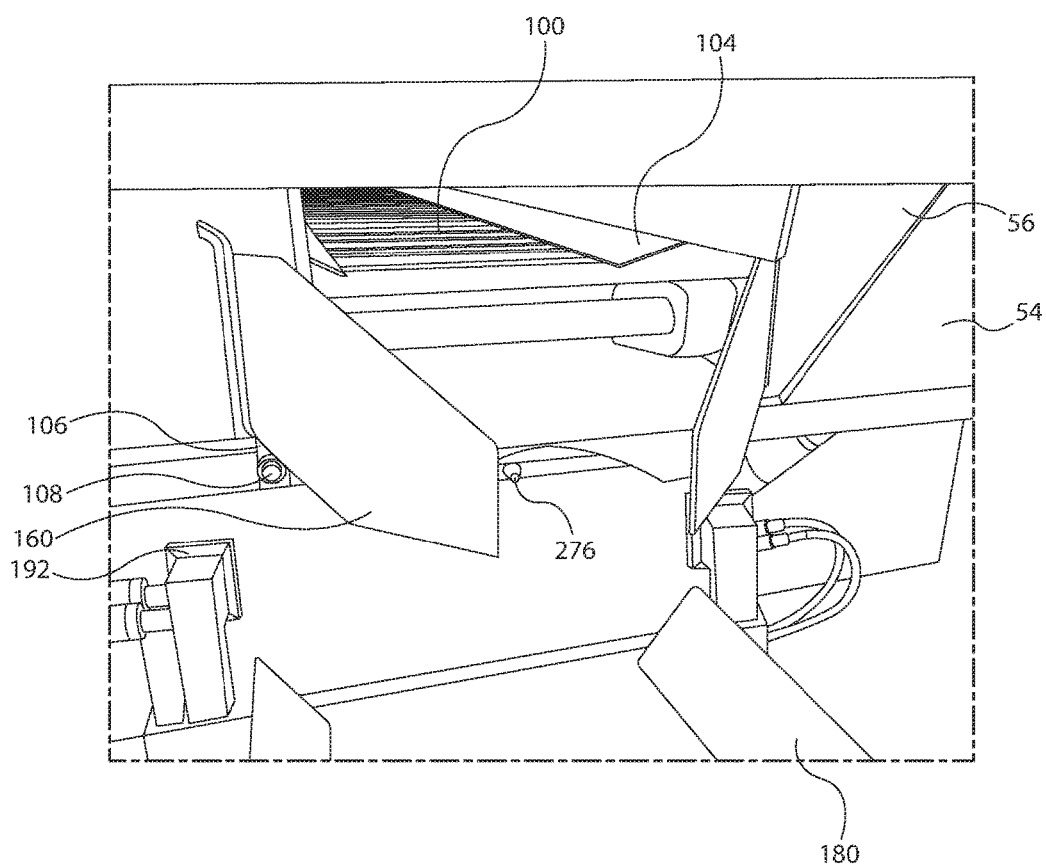
FIG. 5 is a partial view of an endless conveyor and spreader assembly.
Figure 6:
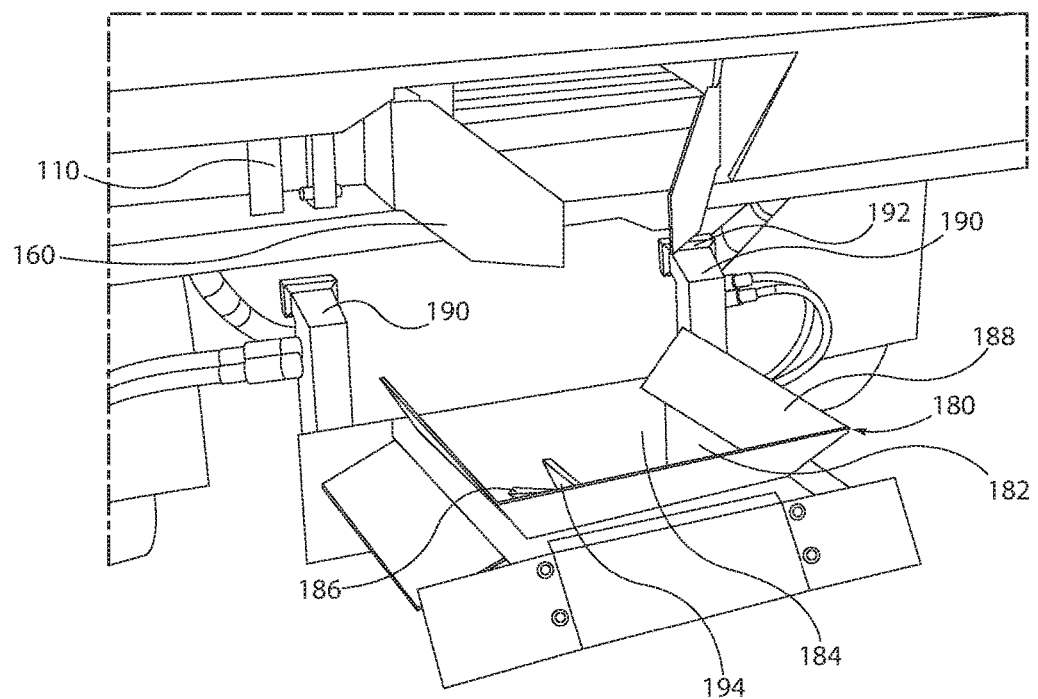
FIG. 6 is another partial view of the endless conveyor and spreader assembly.
Figure 7:
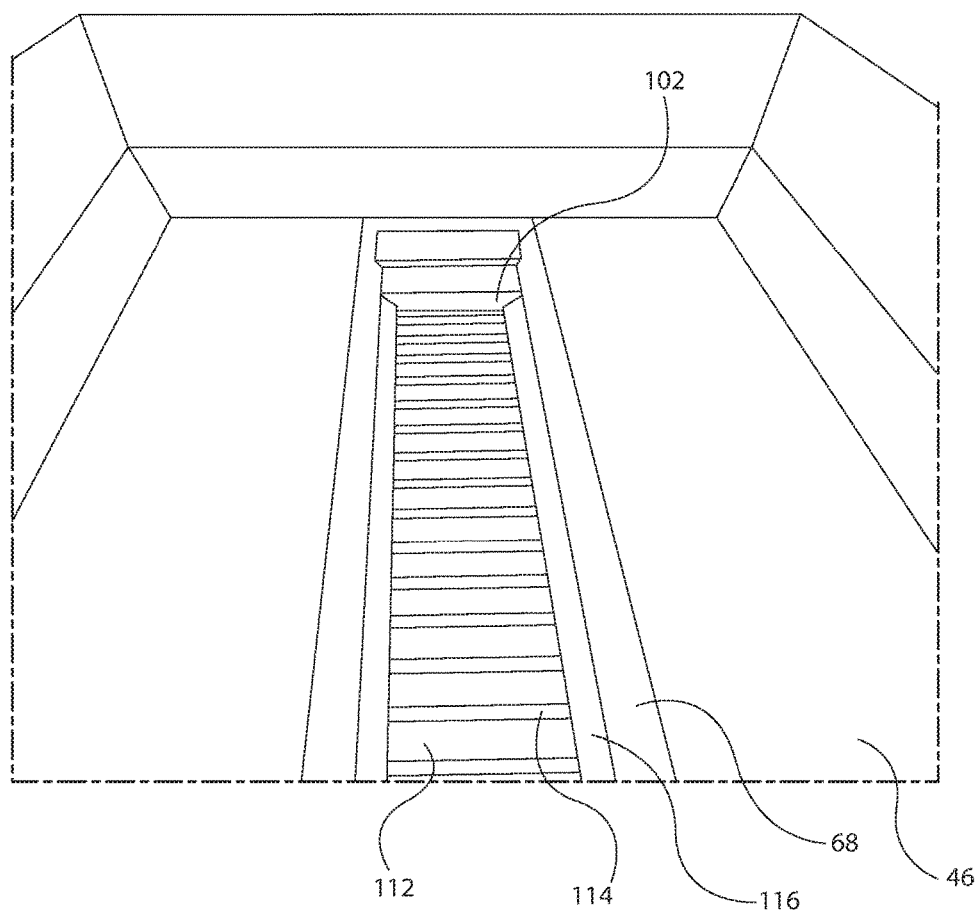
FIG. 7 is a view of the endless conveyor below a first opening in a floor of the dump body.
Figure 8:
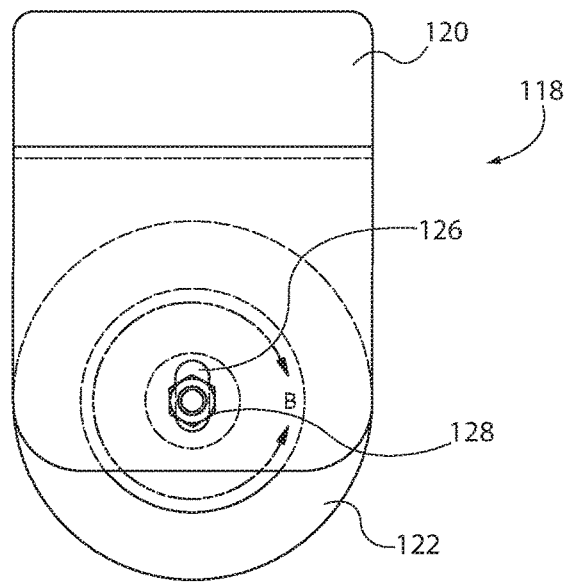
FIG. 8 is a front view of a wheel assembly of the endless conveyor.
Figures 9, 10:
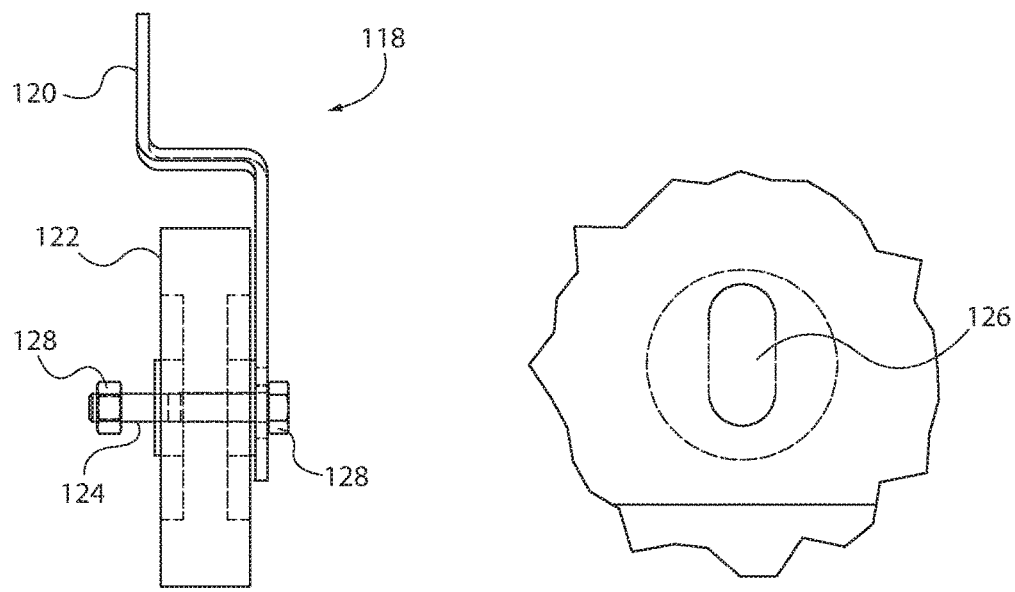
FIG. 9 is a side view of the wheel assembly.
FIG. 10 is a detailed view of detail B of FIG. 8.

The material passing through the chute 130 and the third opening 56 is guided by material guides 160 shown in FIGS. 5 and 6. The material guides 160 are provided at opposite sides of the endless conveyor 100 to direct the material towards a spreader assembly 180. In another embodiment, the material guides 160 are replaced by a conveyor lip 162 shown in FIGS. 15-17 for directing material towards the spreader assembly 180. The conveyor lip 162 includes a body 164 having a curved portion, wings 166 extending from either side of the body 164, and attachment portions 168 having openings 170 for receiving fasteners for coupling the conveyor lip 162 to the dump body 118. In another embodiment, the conveyor lip 162 can be coupled to the endless conveyor 100.

Figure 3:
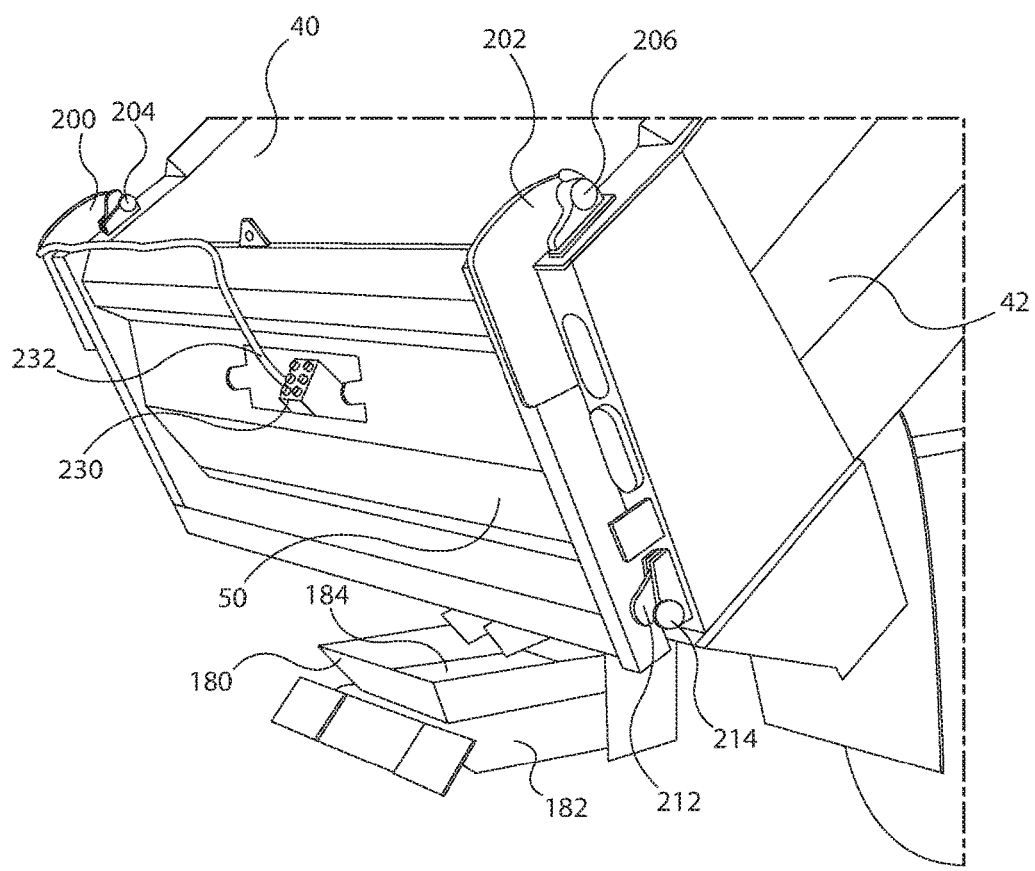
FIG. 3 is another perspective view of a portion of the vehicle with the dump body in a raised position.

The material passing by the material guides 160 or conveyor lip 162 is directed downward (via gravity after reaching the end of the endless conveyor 100) to the spreader assembly 180 shown in FIGS. 3 and 6, disposed below the endless conveyor 100 and attached to the frame 12 such that the spreader assembly 180 remains substantially parallel to the frame 12 when the dump body 18 is in the load position and/or the dump position. For example, the spreader assembly 180 is stationary when the body and/or the conveyor 100 move between the load position and the dump position. The spreader assembly 180 includes a housing 182 defining an opening 184, a spinner 186 disposed in the opening 184, a plurality of angled plates 188 around a top portion of the housing 182 for directing the material towards the spinner 186, and a pair of connection rods 190 attached to the housing 182 that removably connect to respective receivers 192 attached to the frame 12. The spinner 186 is connected to the housing 182 in any suitable manner that allows the spinner 186 to spin relative to the housing 182.

The spinner 186 is powered by a motor connected to the housing 182 or the frame 12, and the spinner 186 includes a plurality of circumferentially spaced vanes 194 on its upper surface. In another embodiment, the spinner 186 can be powered by a stand-alone power supply, an integrated power supply, a power supply used by the vehicle or a component of the vehicle, or a combination thereof.

Referring back to FIGS. 3 and 4 and the tailgate 50 in detail, the tailgate 50 is pivotally coupled to the first and second sidewalls 40 and 42 in any suitable manner, such as by pivot arms 200 and 202 received between respective brackets assemblies 204 and 206 at the tops of the first and second sidewalls 40 and 42 and secured by pins or other suitable coupler. The bottom of the tailgate 50 is removably held to the first and second sidewalls 40 and 42 by respective latches 210 and 212 that hold arms 214 projecting out from opposite sides of the bottom of the tailgate 50 in a lock position. The latches 210 and 212 can be moved to an unlock position to release the arms that allow the tailgate 50 to pivot. For example, the latch 210 can be moved by a first air cylinder system and the latch 212 can be moved by a second air cylinder system 216 shown in FIG. 18. By way of example and not limitation, the first air cylinder system can be positioned on a driver side of the vehicle, in a storage compartment within a driver side rear portion of the dump body 18, on a passenger side of the vehicle, coupled to a bottom portion of the dump body 18, in a storage compartment within a passenger side rear portion of the dump body, or a combination thereof. By way of example and not limitation, the second air cylinder system 216 can be positioned on a driver side of the vehicle, coupled to a bottom portion of the dump body 18, in a storage compartment within a driver side rear portion of the dump body 18, on a passenger side of the vehicle, in a storage compartment within a passenger side rear portion of the dump body, or a combination thereof. In an embodiment, the first air cylinder system can be substantially the same as and positioned in a similar spot as the second air cylinder system 216.

Each air cylinder system has one end coupled to a rear cylinder bracket 220 attached to the apron 54 and another end coupled to a respective linkage assembly 222, 224 connected to dump body 18 and the respective latch 210, 212. The air cylinder systems can be controlled from, for example, within the cabin 14 of the vehicle 10, for example by a switch or wireless control signal(s).

A third air cylinder system 230 can be provided that is received in the second opening 52 and positioned within an interior of the tailgate 50. The air cylinder system 230 can be positioned, for example in a center or substantially the center of the tailgate 50 and does not require a cross-bar or support that extends the width of the tailgate 50. For example, support brackets can be secured to an exterior of the tailgate 50 to which the third air cylinder system 230 can be removably coupled thereto. For instance, one or more lock pins can be used to secure the third air cylinder system 230 to the support brackets on the exterior of the tailgate 50. The third air cylinder system 230 is connected to the chute 130 as discussed above. The air cylinder system 230 controls movement of the metering gate 140 to allow/prevent access to the third opening 56, thereby controlling the flow of material onto a road or ground. The third air cylinder system 230 can be controlled from, for example, within the cabin 14 of the vehicle, for example by a switch or wireless signal(s) connected to the air cylinder system by the line 232.

The third air cylinder system 230 or an additional air cylinder system can also move the metering gate 140 prior to the tailgate 50 being released by the first and second air cylinder systems to prevent damage to the metering gate 140. For example, an air cylinder control system can utilize a lock mechanism that provides automated locking and unlocking of the tailgate 50 to allow/restrict pivotable movement of the tailgate 50 without damaging the air cylinder system 230, the chute 130, or control components of the air cylinder system 230. In particular, the lock mechanism can restrict unlocking the tailgate 50 or movement of the tailgate 50 until the chute 130 is moved to a position that allows for safe movement of the tailgate 50 without damaging the air cylinder system 230 or chute 130. For instance, the lock mechanism can maintain the locking of the tailgate 50 until the chute 130 and/or the metering gate 14C) is moved to an open position so as to not be damaged with movement of the tailgate 50 since the chute and/or the metering gate 140 are coupled to the inside of the tailgate 50. Similarly, the lock mechanism can unlock the tailgate 50 when the chute 130 and/or the metering gate 140 is at an open position.

In an embodiment, the air cylinder system can be coupled or mounted to four brackets that are positioned on the exterior of the tailgate. In an embodiment, the air cylinder system can be positioned on an interior of the dump bed and, in particular, an interior of the tailgate 50. Additionally, control components of the air cylinder system can be housed in a compartment of a driver side rear corner (e.g., behind a taillight) or passenger side rear corner (e.g., behind a taillight) of the dump body 18, wherein the compartment is covered by a plate or access cover. In an embodiment, the air cylinder system can be mounted to brackets on an exterior of the tailgate 50 and the air cylinder system placed within an opening on the tailgate 50 inside the dump body 18 so the air cylinder system is positioned within the dump body proximate to the interior of the tailgate 50. It will be appreciated that the vehicle could be adapted to utilize one or more air cylinders or systems to control movement of the chute 130 or the tailgate 50.

Referring again to FIG. 4 and the apron 54 in detail, the apron 54 includes an apron skirt 250, apron reinforcement tubing 252 secured to a bottom of the apron skirt 250, a motor cutout flange 254, a pair of side plates 256 and 258 attached to ends of the apron skirt 250, a reinforcement member 260 between the side plate 256 and long sill 72, and a pair of cylinder brackets 220 attached to opposite sides of the apron skirt 250 for attaching to one of the first or second air cylinder systems.

The apron skirt 250 includes the third opening 56, which includes a first portion 262 and a second portion 264. The first portion 262 receives the endless conveyor 100 and is the exit area for material delivered by the endless conveyor 100 to the spreader assembly 180. The second portion 264 is reinforced by the motor cutout flange 254 and is provided for receiving the motor 110 (illustrated in more detail in FIG. 6) that can power the endless conveyor 100. By way of example and not limitation, the motor 110 can be a hydraulic direct drive motor and can be disposed in a cutout 266 of the long sill 72, the long sill 72, or a combination thereof.

Turning now to FIGS. 29-32, the vehicle 10 can include one or more pre-wet tanks, and in the illustrated embodiment first and second pre-wet tanks 270 and 272 that are removably coupled to the front wall 44 of the dump body 18. In an embodiment, the pre-wet tanks 270 and 272 are supported by a platform coupled to the exterior of the front wall of the dump body 18, wherein the platform is substantially parallel to the ground when the dump body 18 is in the load position. The pre-wet-tanks 270 and 272 can be supported by the platform and secured for additional stability to the dump body 18. For instance, the pre-wet tanks 270 and 272 can be coupled to the dump body 18 with one or more straps 274. The pre-wet tanks 272 and 274 can be positioned on an exterior wall of the front wall 44 with connections (e.g., plumbing, electrical connections, mechanical connections, etc.) running to a nozzle 276 (FIG. 5), such as a brass nozzle controlled by an operator, for example by a switch or wireless signal(s) in the cabin 214 of the vehicle. The nozzle 276 sprays a liquid, such as a deicing solution, onto the material passing through the spreader assembly 180. The liquid from the nozzle 276 can be guided towards the spinner by the angle plates 188. As shown in FIG. 2, the pre-wet tanks each include a first opening 280, 282, connected to the other by a hose 284 with shut-off valves 286 and 288 at each end, and a second opening 290, 292 connected to the nozzle by a respective hose 294 having a respective shut-off valve 296, 298.

The liquid is pumped from the pre-wet tanks 272 and 274 to the nozzle 276 by a pump/motor disposed in a compartment of the dump body 18. By way of example and not limitation, the compartment can be at the rear of the driver side sidewall 40 or the rear of the passenger side sidewall 42 along with respective wiring harnesses or wireless components for connectivity to the cabin 14. The compartment is covered by a removable cover 300 (shown in more detail in FIG. 19). A similar compartment and cover 302 (shown in more detail in FIG. 20) can be provided on the passenger side sidewall 42 for housing the pump/motor and/or a lighting harness or other suitable component.

Figure 33:
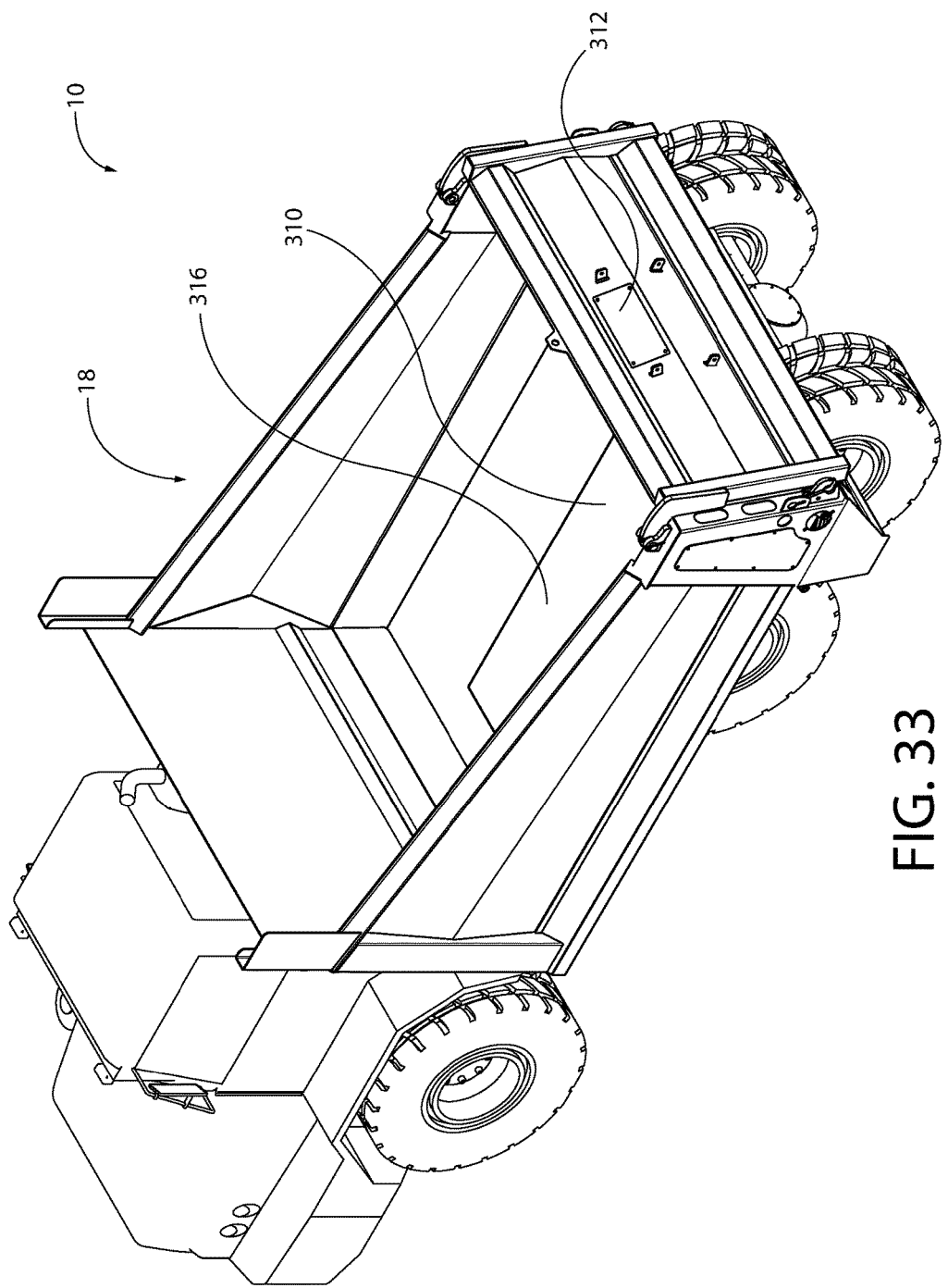
FIG. 33 is a perspective view of the vehicle in a summer mode.
Figure 34:
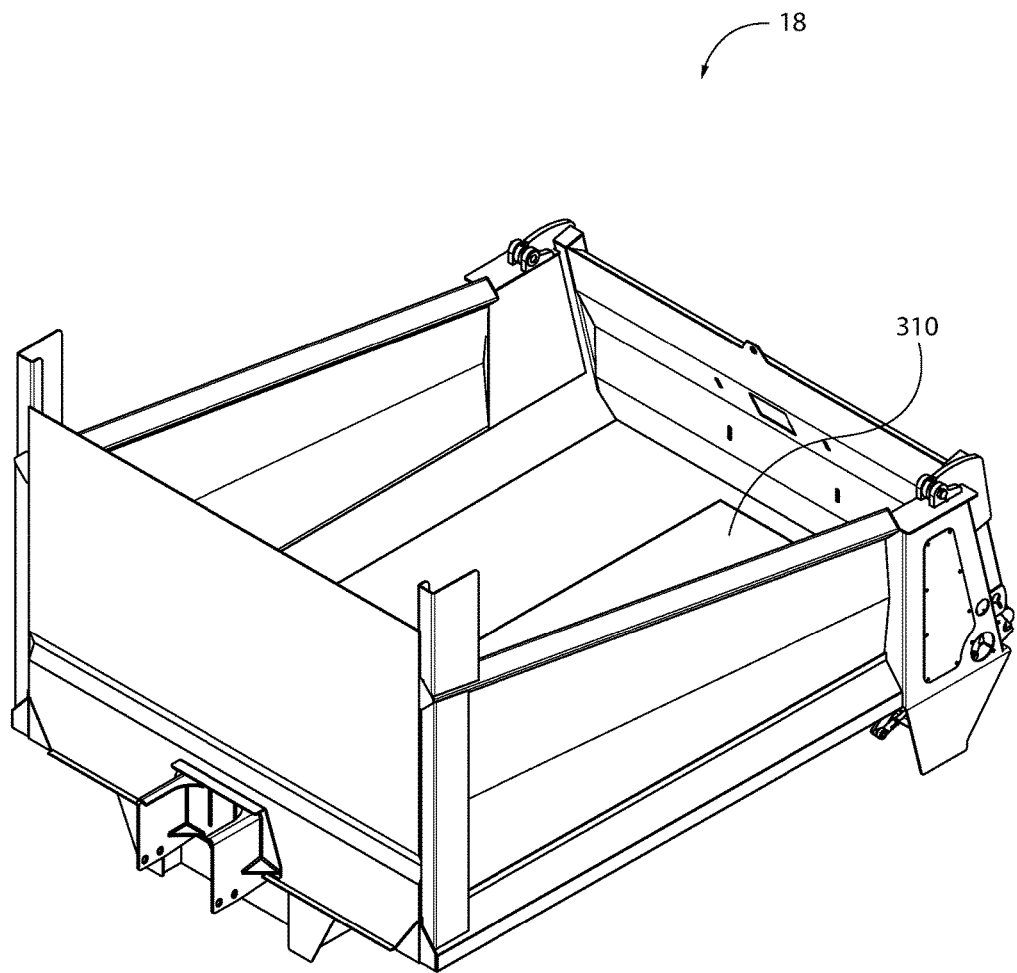
FIG. 34 is a perspective view of the dump body in the summer mode.
Figure 35:
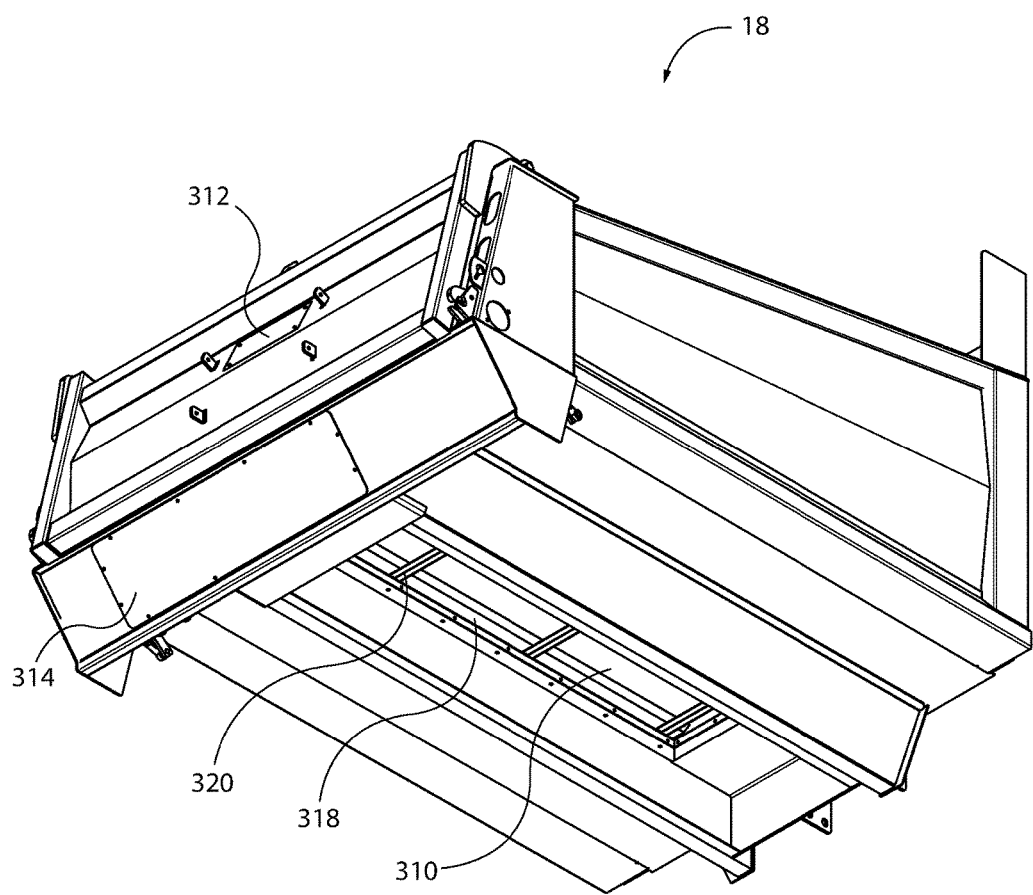
FIG. 35 is another perspective view of the dump body in the summer mode.

Turning now to FIGS. 33-35, the vehicle 10 is shown in a summer mode where the dump body 18 can be used for hauling and dumping material. To convert the vehicle to the summer mode from the described winter mode above, the endless conveyor 100, the spreader assembly 180, the chute 130, the third cylinder assembly 230, among others can be removed from the vehicle 10. The endless conveyor 100 is removed by removing the bolts 108 and pulling the endless conveyor 100 out of the third opening 56. The spreader assembly 180 is removed by disconnecting the connection rods 190 from the receivers 192. The chute 130 and air cylinder 230 are removed by unpinning the components from the tailgate 50. In an embodiment, the motor 110 and/or the one or more pre-wet tanks (e.g., pre-wet tanks 270 and 272) may additionally be removed.

To continue the conversion from the winter mode to the summer mode for the vehicle, a floor plate assembly 310 is then installed over the first opening 48, a tailgate cover 312 is installed over the second opening 52, and an apron cover 314 is installed over the third opening 56. The floor plate assembly 310 includes a floor plate 316, reinforcement rails 318 coupled to a bottom of the floor plate and extending longitudinally along the floor plate 316, and cross members 320 extending horizontally and coupled to the reinforcement rails 318. The floor plate assembly 310 can be held in position due to the weight of the assembly, or alternatively can be coupled to the conveyor support assembly 60 or other suitable component in any suitable manner. The tailgate cover 312 and the apron cover 314 are coupled to the openings 52 and 56 respectively in any suitable manner, such as by bolts.

The aforementioned elements (e.g., vehicle, dump body, tailgate, front wall, passenger side sidewall, driver side sidewall, floor, apron, air cylinder system, covers, control components, spreader assembly, chute, pre-wet tank, metering gate, endless conveyor, among others), and the like have been described with respect to interaction between several components and/or elements. It should be appreciated that such elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In an embodiment, the vehicle includes a spreader assembly removably attached to the frame of the vehicle below the apron, wherein the spreader assembly is substantially parallel to the frame when the body is in the load position and the dump position. In an embodiment, the spreader assembly is stationary when the body and conveyor move between the load position and dump position. In an embodiment, the spreader assembly includes a housing defining an opening positioned to receive material from the third opening, a spinner disposed in the opening and rotatable relative to the housing, and one or more connection rods attached to the housing and removably attached to the frame.

In an embodiment, the vehicle includes a chute assembly attached to the dump body at the second opening to direct material from the conveyor out of the dump body to a spreader assembly.

In an embodiment, the vehicle includes an air cylinder system received in a second opening and positioned within an interior of the tailgate, wherein the air cylinder system is configured to control movement of a door of the chute assembly, wherein the door of the cute assembly meters the amount of material directed to the third opening.

In an embodiment, the vehicle includes a motor that drives the endless conveyor, wherein the motor is received in the second opening and disposed in a cutout of the dump body.

In an embodiment, the third opening includes a first portion and a second portion, and wherein the conveyer is inserted through the first portion, a chute is positioned at the first portion, and a motor that drives the endless conveyor is received in the second portion and attached to the dump body.

In an embodiment, the vehicle includes at least one pre-wet tank coupled to an exterior of the front wall of the dump body and configured to hold a liquid. In an embodiment, the pre-wet tank is coupled to the front wall by at least one or more straps.

In an embodiment, the vehicle includes a nozzle coupled to the frame below the endless conveyor, wherein the at least one pre-wet tank and the nozzle are fluidly coupled by at least one hose. In an embodiment, the vehicle includes a pump or a motor disposed in a cavity in one of the first or second sidewalls and coupled to the pre-wet tank and the nozzle to pump fluid from the pre-wet tank to the nozzle.

In an embodiment, the vehicle includes a plurality of wheel assemblies coupled to sides of the endless conveyor, wherein each wheel assembly includes a bracket coupled to one of the sides of the endless conveyor, a wheel, and an axle extending through the wheel and the bracket, wherein the axle has a longitudinal axis perpendicular to a longitudinal axis of the endless conveyor.

In an embodiment, the kit can include the spreader assembly that is configured to be substantially parallel to the frame when the body is in the load position and the dump position. In an embodiment, the kit includes a floor plate assembly configured to cover the first opening in the floor of the dump body, a tailgate cover configured to cover the second opening in the tailgate of the dump body, and an apron cover configured to cover the third opening in the apron of the dump body. In the embodiment, the spreader assembly includes a housing defining an opening to receive material from the third opening, a spinner disposed in the opening and rotatable relative to the housing, and one or more connection rods attached to the housing and configured to be removably attached to the frame. In an embodiment, the kit includes one or more pre-wet tanks that deliver a liquid to the opening of the spreader assembly and configured to be removably coupled to an exterior of a front wall of the dump body.

In an embodiment, the vehicle includes a spreader assembly removably attached to the frame of the vehicle below the apron, wherein the spreader assembly includes a housing that is stationary when the body is in the load position and the dump position.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A vehicle including:
   a frame;
   a dump body supported by the frame and configured to move relative to the frame between a dump position and a load position, the dump body including first and second sidewalls, a front wall, a floor having a first opening, a tailgate, and an apron below the tailgate, the apron having a second opening perpendicular to the first opening;
   a spreader assembly removably attached to the frame of the vehicle below the apron in a fixed position relative to the frame when the body moves between the load position and the dump position; and
   an endless conveyor positioned in the first opening, configured to direct material to the second opening and removably attached to the dump body below the floor, wherein a material in the dump body is prevented from exiting the dump body through the first opening.

2. The vehicle according to claim 1, wherein the spreader assembly is removably attached to the frame of the vehicle below the apron and adjacent the second opening to receive the material exiting the dump body through the second opening, and wherein the spreader assembly is parallel to the frame when the body is in the load position and the dump position.

3. The vehicle according to claim 2, wherein the spreader assembly includes a housing defining an opening positioned to receive the material from the second opening, a spinner disposed in the opening and rotatable relative to the housing, and one or more connection rods attached to the housing and removably attached to the frame.

4. The vehicle according to claim 1, further including a chute assembly attached to the dump body at the second opening to meter the material from the conveyor that exits out of the dump body from the second opening to the spreader assembly.

5. The vehicle according to claim 4, further including an air cylinder system received in a third opening in the tailgate and positioned within an interior of the tailgate, wherein the air cylinder system is configured to control movement of a gate of the chute assembly.

6. The vehicle according to claim 1, further including a motor that drives the endless conveyor, wherein the motor is disposed in a cutout of the dump body.

7. The vehicle according to claim 1, wherein the second opening includes a first portion and a second portion, and wherein the conveyer is configured to be inserted through the first portion, a chute is positioned at the first portion, and a motor that drives the endless conveyor is received in the second portion and attached to the dump body.

8. The vehicle according to claim 1, further including at least one pre-wet tank coupled to an exterior of the front wall of the dump body and configured to hold a liquid.

9. The vehicle according to claim 8, wherein the at least one pre-wet tank is coupled to the front wall by at least one or more straps.

10. The vehicle according to claim 9, further including a nozzle coupled to the frame below the endless conveyor, wherein the at least one pre-wet tank and the nozzle are fluidly coupled by at least one hose.

11. The vehicle according to claim 10, further including a pump or a motor disposed in a cavity in one of the first or second sidewalls and coupled to the at least one pre-wet tank and the nozzle.

12. The vehicle according to claim 1, further including a plurality of wheel assemblies coupled to sides of the endless conveyor, wherein each wheel assembly of the plurality of wheel assemblies includes a bracket coupled to one of the sides of the endless conveyor, a wheel, and an axle extending through the wheel and the bracket, wherein the axle has a longitudinal axis perpendicular to a longitudinal axis of the endless conveyor.

13. The vehicle according to claim 1, wherein the endless conveyor is removably coupled to the apron via fasteners.

14. The vehicle according to claim 1, wherein the spreader assembly includes one or more connection rods removably attached to the frame, a housing attached to the one or more connection rods, and a spinner rotatable relative to the housing, and wherein the one or more connection rods and the housing are stationary when the body and conveyor move between the load position and dump position.

15. The vehicle according to claim 1, wherein the spreader is free of a connection to the dump body.

16. A vehicle including:
a frame;
a dump body supported by the frame and configured to move relative to the frame between a dump position and a load position, the dump body including first and second sidewalls, a front wall, a floor having a first opening, a tailgate, and an apron below the tailgate, the apron having a second opening perpendicular to the first opening; and
an endless conveyor positioned in the first opening and configured to direct material to the second opening, the endless conveyor being removably attached to the dump body below the floor for conversion of the vehicle between first and second modes,
wherein when the endless conveyor is positioned in the first opening the vehicle is in the first mode, and when the endless conveyor is removed from the first opening the vehicle is in the second mode.

17. The vehicle according to claim 16, further including a spreader assembly removably attached to the frame of the vehicle in a fixed position relative to the frame when the body and conveyor move between the load position and dump position.

18. The vehicle according to claim 16, further including a spreader assembly removably attached to the frame of the vehicle, wherein the spreader assembly includes one or more connection rods removably attached to the frame, a housing attached to the one or more connection rods, and a spinner rotatable relative to the housing, and wherein the one or more connection rods and the housing are stationary when the body and conveyor move between the load position and dump position.

19. A vehicle including:
a frame;
a dump body supported by the frame and configured to move relative to the frame between a dump position and a load position, the dump body including first and second sidewalls, a front wall, a floor having a first opening, a tailgate, and an apron below the tailgate, the apron having a second opening perpendicular to the first opening;
a spreader assembly removably attached to the frame of the vehicle in a fixed position relative to the frame when the body moves between the load position and the dump position; and
an endless conveyor positioned in the first opening, configured to direct material to the second opening, and readily removably attached to the dump body below the floor,
wherein a material in the dump body is prevented from exiting the dump body through the first opening.

* * * * *